(12) United States Patent
Kuchiki

(10) Patent No.: US 9,402,063 B2
(45) Date of Patent: Jul. 26, 2016

(54) IMAGE PICKUP APPARATUS THAT PERFORMS WHITE BALANCE CONTROL AND METHOD OF CONTROLLING THE SAME

(71) Applicant: CANON KABUSHIKI KAISHA, Tokyo (JP)

(72) Inventor: Hiroaki Kuchiki, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/720,215

(22) Filed: May 22, 2015

(65) Prior Publication Data
US 2015/0350620 A1    Dec. 3, 2015

(30) Foreign Application Priority Data

May 30, 2014  (JP) ................................ 2014-112589

(51) Int. Cl.
*H04N 9/73* (2006.01)
*H04N 9/04* (2006.01)

(52) U.S. Cl.
CPC ............... *H04N 9/735* (2013.01); *H04N 9/045* (2013.01)

(58) Field of Classification Search
CPC ......... H04N 9/3182; H04N 9/68; G09G 5/02; G09G 3/2003; G09G 3/3607
USPC ...................................... 348/223.1
See application file for complete search history.

(56) References Cited

U.S. PATENT DOCUMENTS

| 6,788,339 B1 | 9/2004 | Ikeda | |
|---|---|---|---|
| 7,589,765 B2 | 9/2009 | Kitajima | |
| 2002/0167596 A1 | 11/2002 | Suzuki et al. | |
| 2003/0058350 A1* | 3/2003 | Ishimaru | H04N 9/735 348/223.1 |
| 2009/0079834 A1* | 3/2009 | Otsu | H04N 5/33 348/169 |

FOREIGN PATENT DOCUMENTS

| EP | 2 928 183 A1 | 10/2015 |
|---|---|---|
| JP | 11-262029 A | 9/1999 |
| JP | 2003-163944 A | 6/2003 |
| JP | 2004-064468 A | 2/2004 |

(Continued)

OTHER PUBLICATIONS

Combined Search and Examination Report, dated Oct. 27, 2015 for counterpart German Patent Appln No. 1509171.3.

*Primary Examiner* — Sinh Tran
*Assistant Examiner* — Selam T Gebriel
(74) *Attorney, Agent, or Firm* — Fitzpatrick, Cella, Harper & Scinto

(57) ABSTRACT

An image pickup apparatus capable of properly performing white balance control on an image. A photographed image is divided into areas and a color evaluation value is acquired from each area. Infrared light is detected from each of areas of an object defined in association with the areas of the image. White balance correction is performed on the image using a mixed WB correction value calculated by mixing a first WB correction value calculated using the color evaluation values included in a white detection range set in a color space and a second WB correction value calculated using the color evaluation values acquired from areas each having an infrared light amount larger than a predetermined amount and included in a detection range of a predetermined color other than white, set in the color space.

12 Claims, 19 Drawing Sheets

(56) References Cited  * cited by examiner

FOREIGN PATENT DOCUMENTS

| JP | 2006-174281 A | 6/2006 |
| JP | 2012-119756 A | 6/2012 |

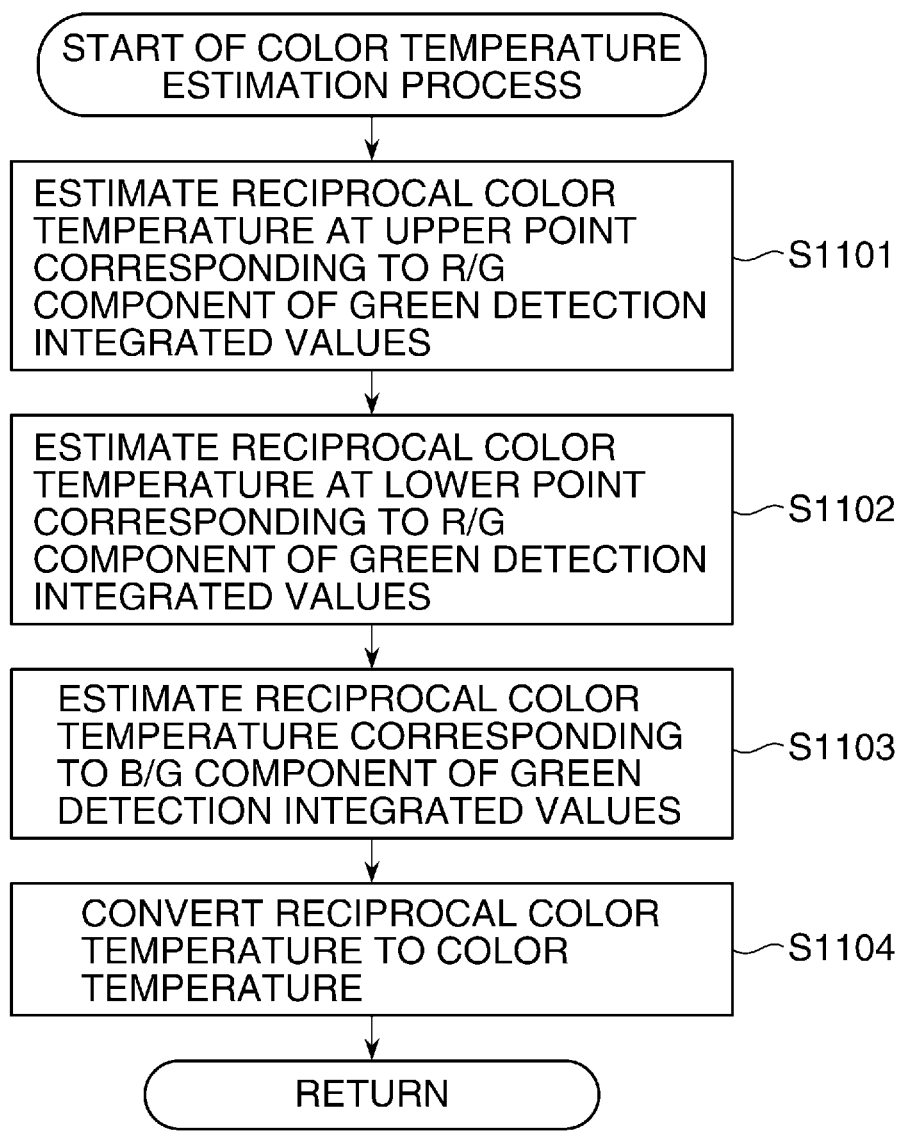

IMAGE PICKUP APPARATUS THAT PERFORMS WHITE BALANCE CONTROL AND METHOD OF CONTROLLING THE SAME

BACKGROUND OF THE INVENTION

1. Field of the Invention

The present invention relates to an image pickup apparatus that performs white balance control and a method of controlling the same, and more particularly to white balance processing performed by the image pickup apparatus.

2. Description of the Related Art

In recent years, in automatic white balance processing performed by an image pickup apparatus, a so-called TTL (Through The Lens) method is widely used. In automatic white balance processing using the TTL method, the color of light from a light source is estimated according to an image obtained by photographing. Further, to calculate a white balance correction value (hereinafter referred to as a WB correction value), it is necessary to accurately distinguish, on the image, between the color of light from the light source and the color of the object.

For example, there has been proposed an image pickup apparatus that is configured to change a white change range for determining an evaluation value of a color signal according to a photographing condition and an object condition, to thereby perform accurate color temperature detection and white balance control, in a manner independent of a luminance signal level (see Japanese Patent Laid-Open Publication No. H11-262029).

Further, there has been proposed an image pickup apparatus that is configured to perform proper white balance control with respect to a green object included in a white extraction range, on which an action for converting green to an achromatic color works (e.g. in a case where green trees or grasses are photographed in a dark place, such as a place in the shade) (see Japanese Patent Laid-Open Publication No. 2006-174281). In this image pickup apparatus, white balance is controlled by determining, based on distribution of data on a three-dimensional coordinate system having an illuminance, an amount of green, and an R gain, as coordinate axes, whether an image has been photographed indoors using indoor fluorescent lamps as a light source, or has been photographed outdoors in the sun/shade.

Now, let it be assumed that the color of light from a light source itself, such as a mercury lamp, is green, and a scene is photographed in which a whole image obtained by photographing is made greenish by the light (first scene). Further, let it be assumed that a scene in which there are a lot of green trees or grasses (second scene) are photographed in a dark place, such as a place in the shade. In such cases, it is difficult for the image pickup apparatuses, described in Japanese Patent Laid-Open Publication No. H11-262029 and Japanese Patent Laid-Open Publication No. 2006-174281, to discriminate between the first scene and the second scene.

That is, in the image pickup apparatus described in Japanese Patent Laid-Open Publication No. H11-262029, the first scene and the second scene both have similar evaluation values of the brightness and the color of the object between the two scenes, and hence there is a high possibility that the WB correction values for the first scene and the second scene are also similar to each other.

Further, also in the image pickup apparatus described in Japanese Patent Laid-Open Publication No. 2006-174281, the whole image is made greenish due to the influence of the color of light from the light source, and hence even with the use of the amount of green and the R gain, it is difficult to discriminate between the first scene and the second scene.

It is desirable that the green colored by the light from the light source in the first scene is converted to an achromatic color, but it is desirable that the green of the object in the second scene is made brilliant. Therefore, it is desirable to discriminate between the first scene and the second scene, and change the WB correction value according to the scene.

SUMMARY OF THE INVENTION

The present invention provides an image pickup apparatus that is capable of properly performing white balance control on an image from which a large amount of a similar color is detected, by determining whether the detected color is a color of light from a light source or a color of the object.

In a first aspect of the present invention, there is provided an image pickup apparatus comprising an image pickup device, an acquisition unit configured to divide an image obtained by image pickup performed by the image pickup device into a plurality of areas, and acquire a color evaluation value from each area, an infrared light sensor configured to detect infrared light from each of areas of an object defined in association with the areas of the image, respectively, a calculation unit configured to calculate a white balance correction value using a plurality of color evaluation values acquired from the image, and a processing unit configured to perform white balance correction processing on the image using a mixed white balance correction value calculated by the calculation unit, wherein the calculation unit includes a first white balance correction value calculation section configured to calculate a first white balance correction value, using, out of the plurality of color evaluation values, color evaluation values which are included in a white detection range set in a color space, a second white balance correction value calculation section configured to calculate a second white balance correction value, using, out of the plurality of color evaluation values, color evaluation values which are acquired from areas each having an infrared light amount larger than a predetermined amount, and are included in a detection range of a predetermined color other than white, set in the color space, and a mixed white balance correction value calculation section configured to calculate a mixed white balance correction value by mixing the first white balance correction value and the second white balance correction value.

In a second aspect of the present invention, there is provided an image pickup apparatus comprising an image pickup device, an acquisition unit configured to divide an image obtained by image pickup performed by the image pickup device into a plurality of areas, and acquire a color evaluation value from each area, an infrared light sensor configured to detect infrared light from each of areas of an object defined in association with the areas of the image, respectively, a calculation unit configured to calculate a white balance correction value using a plurality of color evaluation values acquired from the image, based on a result of detection of an infrared light amount, performed, on an area-by-area basis, by the by infrared light sensor, and a processing unit configured to perform white balance correction processing on the image using the white balance correction value calculated by the calculation unit.

In a third aspect of the present invention, there is provided a method of controlling an image pickup apparatus including an image pickup device, including dividing an image obtained by image pickup performed by the image pickup device into a plurality of areas, and acquiring a color evaluation value from each area, detecting infrared light from each of areas of an object defined in association with the areas of the image, respectively, calculating a white balance correction value using a plurality of color evaluation values acquired from the image, and performing white balance correction processing on the image using a mixed white balance correction value calculated by said calculating, wherein said calculating comprises calculating a first white balance correction value, using, out of the plurality of color evaluation values, color evaluation values which are included in a white detection range set in a color space, calculating a second white balance correction value, using, out of the plurality of color evaluation values, color evaluation values which are acquired from areas each having an infrared light amount larger than a predetermined amount, and are included in a detection range of a predetermined color other than white, set in the color space, and calculating a mixed white balance correction value by mixing the first white balance correction value and the second white balance correction value.

According to the present invention, it is possible to properly perform white balance control by determining whether the color in the image is the color of light from the light source or the color of the object.

Further features of the present invention will become apparent from the following description of exemplary embodiments (with reference to the attached drawings).

BRIEF DESCRIPTION OF THE DRAWINGS

FIGS. 7A to 7H are diagrams useful in explaining tables used for calculation of a reliability, performed by the white balance controller appearing in FIG. 2, in which FIG. 7A shows a table for use in calculating a ratio-based reliability, FIG. 7B shows a table for use in calculating a distance-based reliability, FIG. 7C shows a table for use in calculating a color reliability, FIG. 7D shows a table for use in calculating a luminance-based reliability, FIG. 7E shows an example of a table for use in calculating an infrared light-based reliability, FIG. 7F shows another example of the table for use in calculating the infrared light-based reliability, FIG. 7G shows a table for use in calculating a green reliability, and FIG. 7H shows a table for use in calculating an evening scene color reliability.

FIGS. 8A and 8B are diagrams useful in explaining infrared light determination-based green detection performed in a step of the WB correction value calculation process in FIG. 4, in which FIG. 8A shows an example of an image represented by RAW data, and FIG. 8B shows a state in which the image shown in FIG. 8A is divided into a predetermined number of blocks.

FIGS. 10A to 10D are diagrams useful in explaining calculation of the WB correction value, performed by the white balance controller appearing in FIG. 2, in which FIG. 10A is a diagram useful in explaining green detection based on infrared light determination, FIG. 10B is a diagram useful in explaining color temperature estimation based on green detection, FIG. 10C is a diagram useful in explaining WB correction value calculation based on color temperature estimation, and FIG. 10D is a diagram useful in explaining calculation of a final WB correction value based on the white-based WB correction value and an infrared light-based WB correction value.

FIG. 11 is a flowchart of a green detection-based color temperature estimation process performed in a step of the WB correction value calculation process in FIG. 4.

FIGS. 14A to 14D are diagrams useful in explaining an evening scene color detection process shown in FIG. 13, in which FIG. 14A shows an example of an image obtained by photographing an evening scene, FIG. 14B shows a state in which the image shown in FIG. 14A is divided into a predetermined number of blocks, FIG. 14C shows an example of an image obtained by photographing the inside of a gymnasium, and FIG. 14D shows a state in which the image shown in FIG. 14C is divided into a predetermined number of blocks.

FIGS. 16A to 16D are diagrams useful in explaining calculation of the WB correction value, which is performed by a white balance controller of the image pickup apparatus according to the second embodiment, in which FIG. 16A is a diagram useful in explaining evening scene color detection based on infrared light determination, FIG. 16B is a diagram useful in explaining color temperature estimation based on evening scene color detection, FIG. 16C is a diagram useful in explaining WB correction value calculation based on color temperature estimation, and FIG. 16D is a diagram useful in explaining calculation of the final WB correction value based on the white-based WB correction value and the infrared light-based WB correction value.

DESCRIPTION OF THE EMBODIMENTS

The present invention will now be described in detail below with reference to the accompanying drawings showing embodiments thereof.

Figure 1:
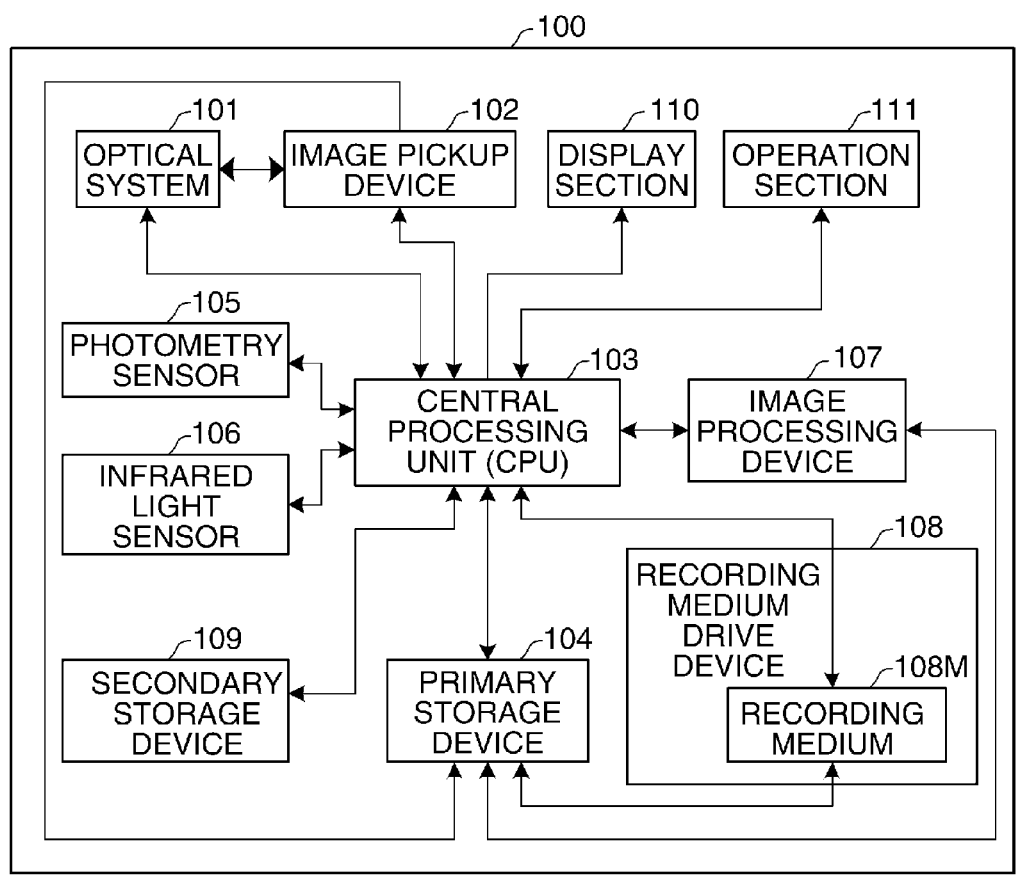
FIG. 1 is a block diagram of a digital camera as an image pickup apparatus according to a first embodiment of the present invention.

FIG. 1 is a block diagram of an image pickup apparatus according to a first embodiment of the present invention.

The image pickup apparatus is e.g. a digital camera (hereinafter simply referred to as the camera), but may be e.g. a digital video camera. Further, the image pickup apparatus may be an electronic device having a camera function, such as a mobile phone with the camera function or a computer with a camera.

The camera, denoted by reference numeral 100 in FIG. 1, has an optical system 101 including a lens, a shutter, and a diaphragm. An object image (optical image) is formed on an image pickup device 102 via the optical system 101. At this time, optical system information, such as a focal length, a shutter speed, and an aperture value, is sent from the optical system 101 to a central processing unit (CPU) 103.

The image pickup device 102 is e.g. a CCD image sensor or a CMOS image sensor, in which a plurality of pixels are arranged in a two-dimensional matrix. Further, color filters for separating incident light into color components of the colors of R (red), G (green), and B (blue), are arranged in a Bayer array on the pixels. The image pickup device 102 converts an optical image into analog signals indicative of luminance information of each pixel.

An analog signal as an output from the image pickup device 102 is converted to a digital image signal by an analog-to-digital converter (not shown). This digital image signal is RAW data before being subjected to development processing, and is stored in a primary storage device 104 by the CPU 103. Note that electric gains (hereinafter referred to as the ISO sensitivity) of the image pickup device 102 are set by the CPU 103.

A photometry sensor 105 has a plurality of photometry areas (for example, a total of 96 photometry areas formed by 12 (horizontal)×8 (vertical) areas), and detects an object luminance of each photometry area according to an amount of light incident through the optical system 101. Then, the detected object luminance values are converted to digital luminance signals by an analog-to-digital converter (not shown) and are sent to the CPU 103.

Note that the number of the photometry areas of the photometry sensor 105 is only required to be a positive number, and is not limited to the above example.

An infrared light sensor 106 is divided into the same number of areas as the photometry areas of the photometry sensor 105, and detects an amount of infrared light from each area according to an amount of light incident through the optical system 101. Then, the detected infrared light amounts are converted to digital infrared light signals by an analog-to-digital converter (not shown) and are sent to the CPU 103.

The CPU 103 controls the overall operation of the camera 100, and controls the camera 100 according to programs stored in advance. At least part of functions realized, in the following description, by the CPU 103 executing associated programs may be realized by dedicated hardware, such as an ASIC (Application-Specific Integrated Circuit).

The primary storage device 104 is a volatile storage device, such as a RAM, and is used as a work area by the CPU 103. Further, data and information stored in the primary storage device 104 are used by the image processing device, denoted by reference numeral 107, and further, are recorded in a recording medium 108M set in a recording medium drive device 108.

A secondary storage device 109 is a nonvolatile storage device, such as an EEPROM. The secondary storage device 109 stores programs (firmware) for controlling the camera 100 and information on various settings, which are used by the CPU 103.

The recording medium 108M removably set in the recording medium drive device 108 records image data and the like stored in the primary storage device 104. The recording medium 108M is e.g. a semiconductor memory card. Further, the image data and the like recorded in the recording medium 108M can be read out by the other devices, such as a personal computer.

A display section 110 displays a view finder image before photographing, and displays a photographed image obtained by photographing. Further, the display section 110 displays a GUI image for an interactive operation.

An operation section 111 is an input device group that receives information input by a user's operation and sends the input information to the CPU 103. The operation section 111 is provided with buttons, a lever, a touch panel, and so forth. Further, the operation section 111 may be an input device using voice and line of sight. Further, the operation section 111 is provided with a release button for starting photographing.

The camera 100 shown in FIG. 1 has a plurality of modes of image processing performed by the image processing device 107, and one of these modes of image processing can be selected and set on the operation section 111 as a photographing mode.

The image processing device 107 performs predetermined image processing on image data obtained by photographing. For example, the image processing device 107 performs image processing called development processing, such as white balance processing, color interpolation processing for converting an RGB Bayer array signal to three plane signals of red, green, and blue, gamma correction processing, chroma correction processing, and color phase correction processing.

Although in the illustrated example, as described hereinafter, the image processing device 107 performs arithmetic operations for white balance control, at least one or some of these functions of the image processing device 107 may be realized by the CPU 103 by software.

Figure 2:
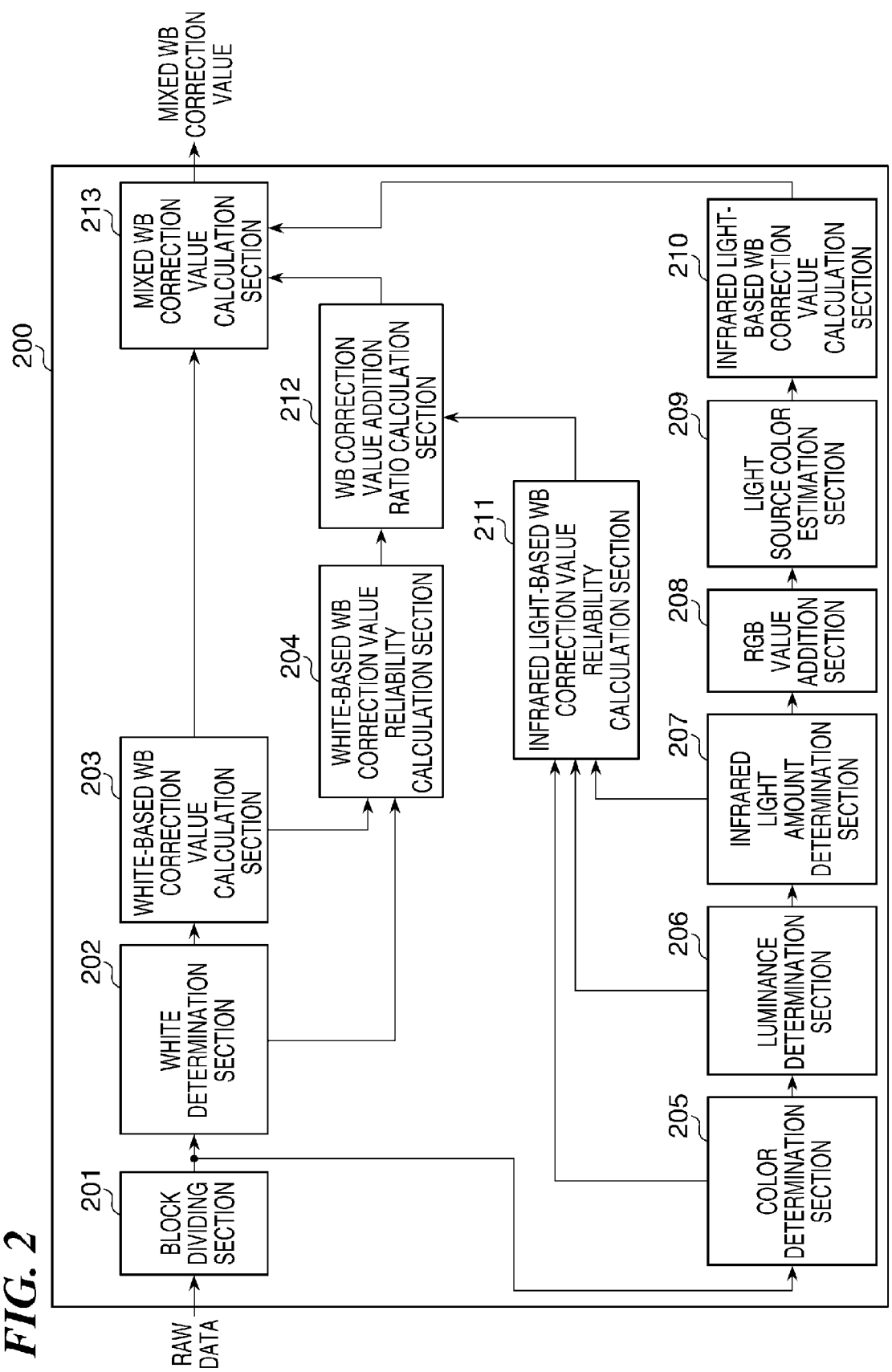
FIG. 2 is a block diagram of a white balance controller included in the image pickup apparatus, appearing in FIG. 1.

FIG. 2 is a block diagram of a white balance controller 200 (hereinafter referred to as the WB controller 200) included in the image processing device 107 appearing in FIG. 1.

The WB controller 200 performs white balance processing. The WB controller 200 calculates a mixed WB correction value according to a WB correction value calculated based on pixels estimated as white (hereinafter referred to as the white-based WB correction value) and a WB correction value calculated based on an infrared light amount (hereinafter referred to as the infrared light-based WB correction value).

As shown in FIG. 2, the WB controller 200 includes a block dividing section 201, a white determination section 202, a white-based WB correction value calculation section 203, a white-based WB correction value reliability calculation section 204, a color determination section 205, a luminance determination section 206, an infrared light amount determination section 207, an RGB value addition section 208, a light source color estimation section 209, an infrared light-based WB correction value calculation section 210, an infrared light-based WB correction value reliability calculation section 211, a WB correction value addition ratio calculation section 212, and a mixed WB correction value calculation section 213. Processing executed by each block will be described hereinafter.

Figure 3:
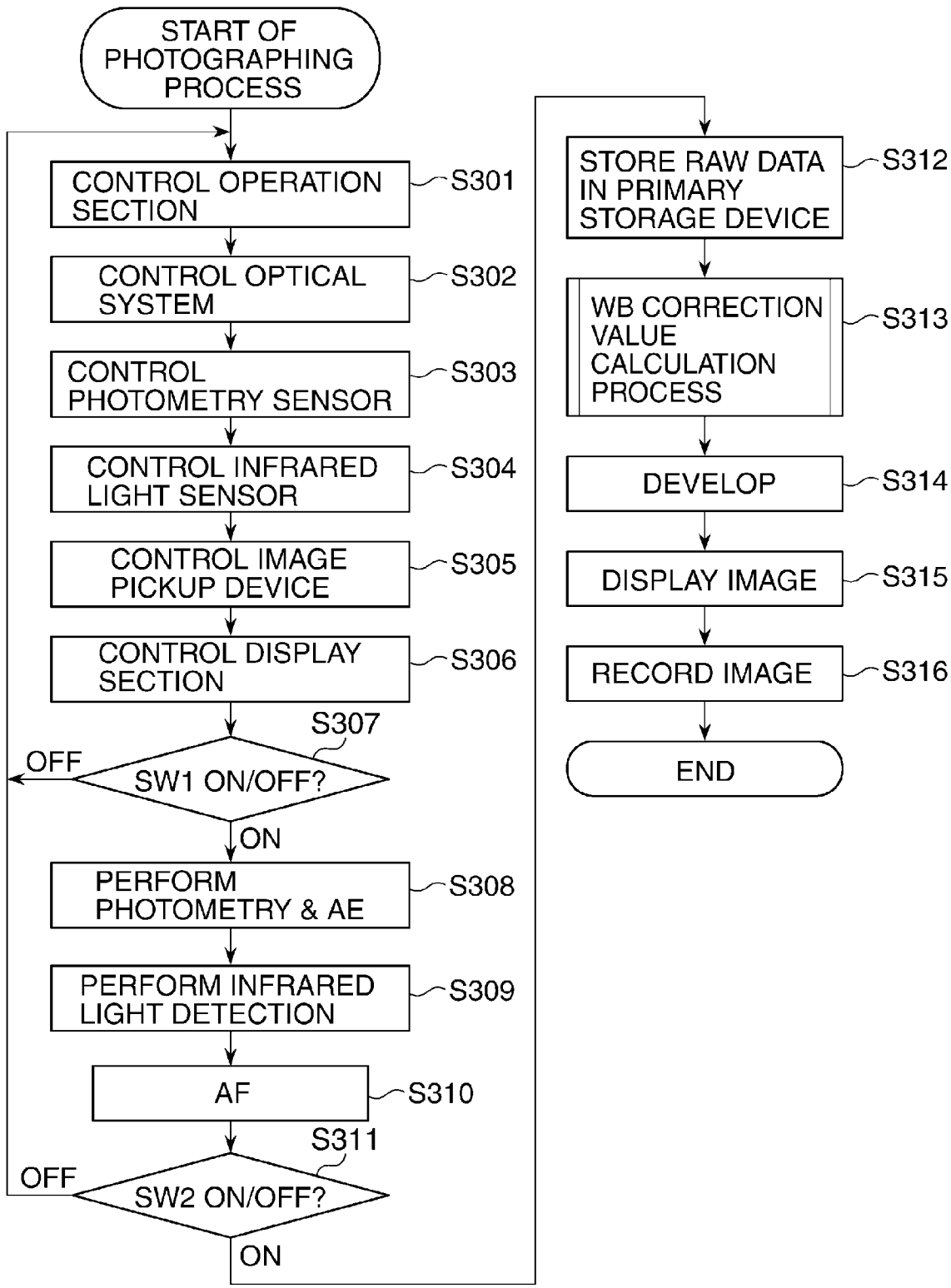
FIG. 3 is a flowchart of a photographing process performed by the digital camera shown in FIG. 1.

FIG. 3 is a flowchart of a photographing process performed by the camera 100 shown in FIG. 1.

Note that the above-mentioned release button is operated in two steps. In the following description, a SW1 of the operation section 111 represents a switch which is turned on when the release button is half-pressed, and a SW2 of the operation section 111 represents a switch which is turned on when the release button is fully pressed. Further, the photographing process in FIG. 3 is performed under the control of the CPU 103.

When the photographing process is started, the CPU 103 receives a user's input from the operation section 111 (step S301: operation section control). Then, the CPU 103 adjusts the settings of a focal length, a shutter speed, an aperture value, and so forth, of the optical system 101, according to the user's input (step S302: optical system control).

Then, the CPU 103 adjusts the photometry areas of the photometry sensor 105 according to the user's input (step S303: photometry sensor control). Further, the CPU 103 adjusts the photometry areas of the infrared light sensor 106 according to the user's input (step S304: infrared light sensor control). Then, the CPU 103 adjusts the settings of the ISO sensitivity and so forth of the image pickup device 102 according to the user's input (step S305: image pickup device control).

Then, the CPU 103 displays information on changes in the settings changed in the steps S302 to S305 on the display section 109 (step S306: display section control). Note that the processing order of the steps S302 to S305 is not limited to the illustrated example, but may be changed.

Next, the CPU 103 determines whether the SW1 of the operation section 111 is on or off (step S307). If the SW1 is off (OFF in the step S307), the CPU 103 returns to the step S301. On the other hand, if the SW1 is on (ON in the step S307), the CPU 103 measures brightness of the object using the photometry sensor 105 (step S308). Further, when in an autoexposure (AE) mode, the CPU 103 adjusts exposure based on the shutter speed, the aperture value, and the ISO sensitivity.

Then, the CPU 103 detects the infrared light amount from each of the same areas as those of the photometry sensor 105, using the infrared light sensor 106 (step S309). Then, if an auto-focus (AF) mode is set, the CPU 103 adjusts the focus using a distance measurement sensor (not shown) (step S310). Note that the processing order of the steps S308 to S310 is not limited to the illustrated example, but may be changed.

Next, the CPU 103 determines whether the SW2 of the operation section 111 is on or off (step S311). If the SW2 is off (OFF in the step S311), the CPU 103 returns to the step S301. On the other hand, if the SW2 is on (ON in the step S311), the CPU 103 controls the shutter to expose the image pickup device 102, and stores RAW data in the primary storage device 104 (step S312).

Then, the CPU 103 controls the image processing device 107 to calculate a WB correction value for the RAW data stored in the primary storage device 104, as described hereinafter (step S313). Then, the CPU 103 corrects (i.e. develops) the RAW data stored in the primary storage device 104 using the WB correction value (mixed WB correction value) to thereby obtain image data (step S314).

After that, the CPU 103 displays an image corresponding to the developed image data on the display section 110 (step S315). The CPU 103 records the developed image data in the recording medium 108M (step S316), followed by terminating the photographing process. Note that the processing order of the steps S315 and S316 is not limited to the illustrated example, but may be changed.

Figure 4:
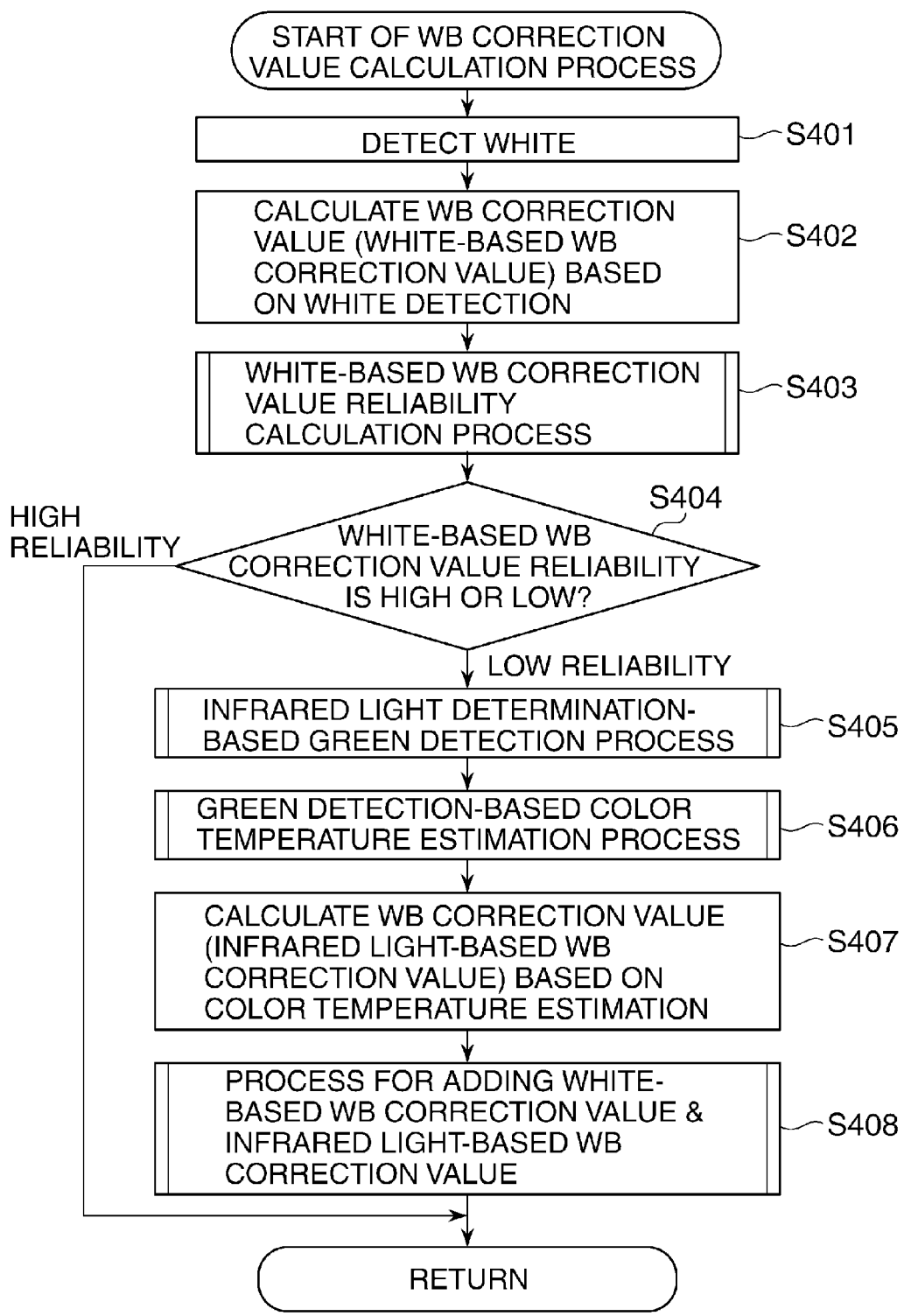
FIG. 4 is a flowchart of a WB correction value calculation process performed in a step of the photographing process in FIG. 3.

FIG. 4 is a flowchart of a WB correction value calculation process performed in the step S313 of the photographing process in FIG. 3.

Referring to FIGS. 2 and 4, the block dividing section 201 receives the RAW data stored in the primary storage device 104, and divides an image represented by the RAW data into a predetermined number of block areas (hereinafter simply referred to as blocks) (for example, a total of 96 block areas formed by 12 (horizontal)×8 (vertical) block areas). Then, the block dividing section 201 calculates integrated values of R, G, and B signal values for each block.

Note that the number of divided blocks is not limited to the above-mentioned example, but is only required to be a positive number. Further, in this example, the number of divided blocks and the divided block areas correspond to the number of divided areas and the divided areas of each of the photometry sensor 105 and the infrared light sensor 106.

Then, the block dividing section 201 calculates a ratio R/G and a ratio B/G based on the respective integrated values of the R, G, and B signal values of each block. Then, the white determination section 202 determines blocks which are included in a white area set on a R/G-B/G coordinate plane defined by the horizontal axis representing the ratio R/G and the vertical axis representing the ratio B/G, and integrates each of the R, G, and B signal values of each of the blocks to thereby obtain integrated values Rinteg, Ginteg, and Binteg, as described hereinafter (step S401: white detection).

Figure 5:
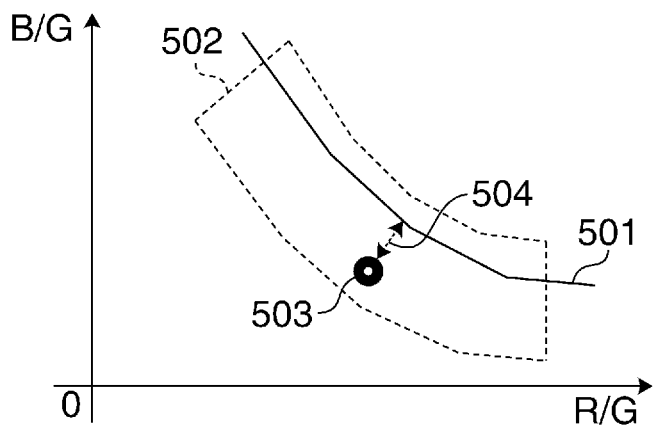
FIG. 5 is a diagram useful in explaining determination processing performed by a white determination section appearing in FIG. 2.

FIG. 5 is a diagram useful in explaining determination processing performed by the white determination section 202 appearing in FIG. 2.

Referring to FIG. 5, the horizontal axis represents the ratio R/G, and the vertical axis represents the ratio B/G. In FIG. 5, a blackbody radiation locus is denoted by reference numeral 501. A white area 502 is set such that (R/G, B/G) coordinates (i.e. a pair of a R/G value and a B/G value) of each of all colors of an achromatic object photographed using each of various lights, such as sunlight (in respective cases of a sunny place and a shady place), tungsten light, mercury lamp light, fluorescent lamp light, and flash light, exist in the area.

Although in FIG. 5, the WB correction value is calculated by extracting a seemingly achromatic pixel from the object using the R/G-B/G coordinate plane, and estimating a color of light from the light source, the WB correction value may be calculated by extracting a seemingly achromatic pixel from the object using any other suitable method.

Referring again to FIGS. 2 and 4, the white-based WB correction value calculation section 203 calculates the WB correction value (white-based WB correction value) according to the R, G, and B integrated values Rinteg, Ginteg, and Binteg, calculated with respect to the blocks within the white area 502, by the following equations (1A) to (1C) (step S402):

R gain of the white-based WB correction value
$$W\_WB\_Rgain = Ginteg/Rinteg \quad (1A)$$

G gain of the white-based WB correction value
$$W\_WB\_Ggain = Ginteg/Ginteg \quad (1B)$$

B gain of the white-based WB correction value
$$W\_WB\_Bgain = Ginteg/Binteg \quad (1C)$$

Then, the white-based WB correction value reliability calculation section 204 calculates a reliability of the white-based WB correction value, as described hereinafter (step S403).

Figure 6:
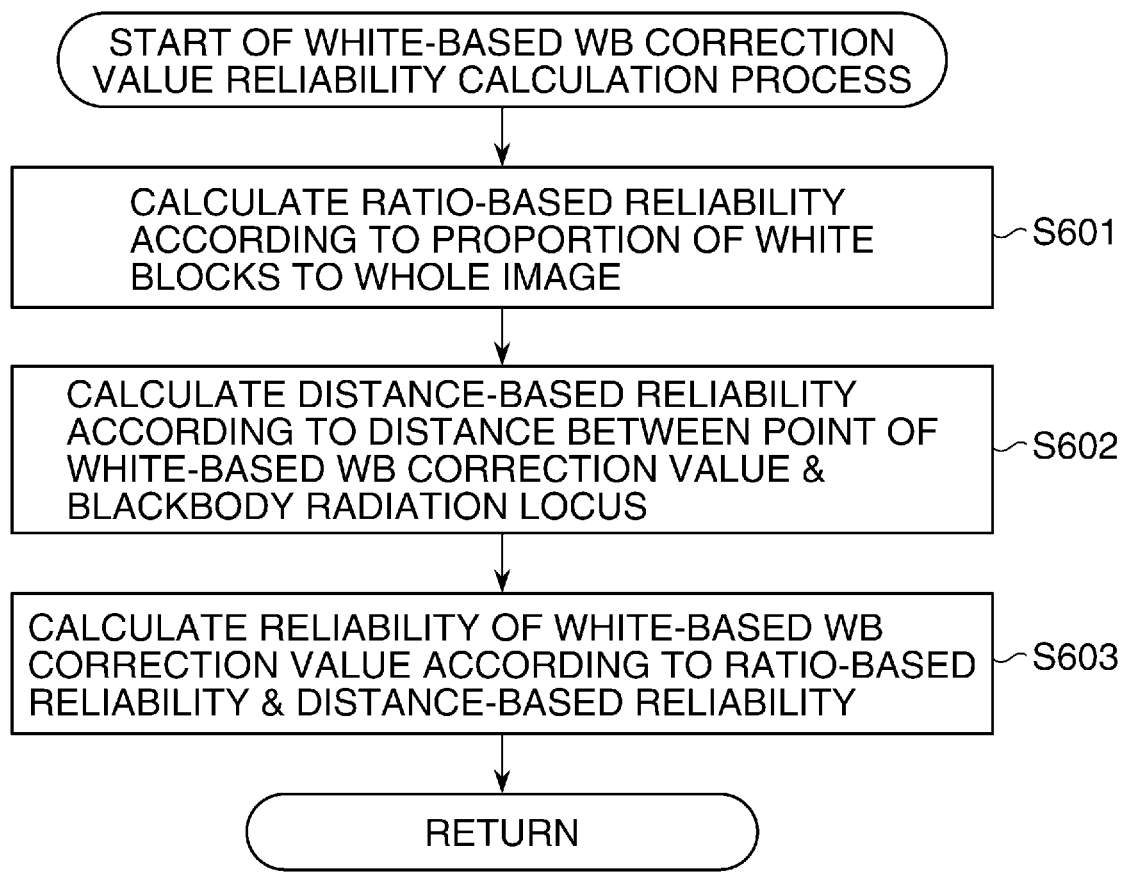
FIG. 6 is a flowchart of a white-based WB correction value reliability calculation process performed in a step of the WB correction value calculation process in FIG. 4.

FIG. 6 is a flowchart of a white-based WB correction value reliability calculation process performed in the step S403 of the WB correction value calculation process in FIG. 4.

The white-based WB correction value reliability calculation section 204 calculates a ratio-based reliability Tratio according to a ratio of the number of white blocks extracted in the step S401 in FIG. 4 to the number of all blocks (i.e. the number of blocks of the whole image) (proportion of areas each having a color evaluation value included in the white detection range to the whole image) (step S601).

Figure 7A:
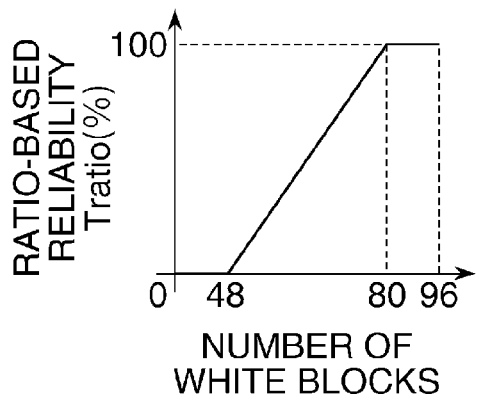
Figure 7B:
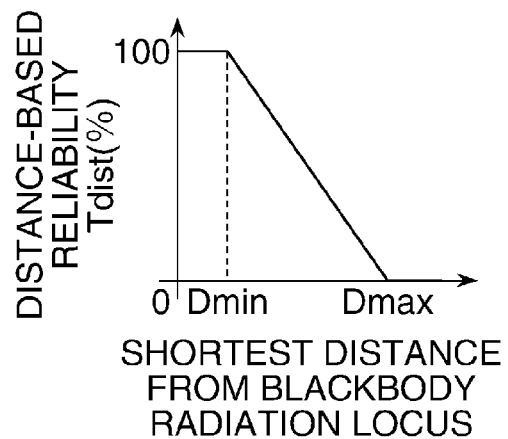
Figure 7C:
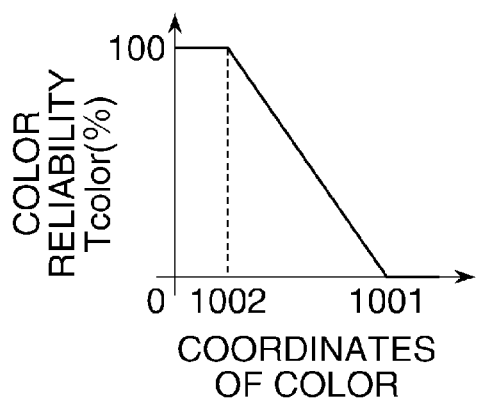
Figure 7D:
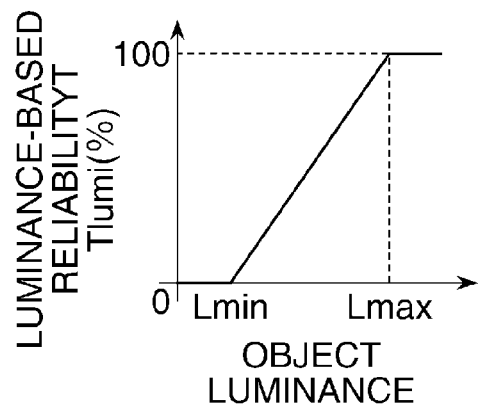
Figure 7E:
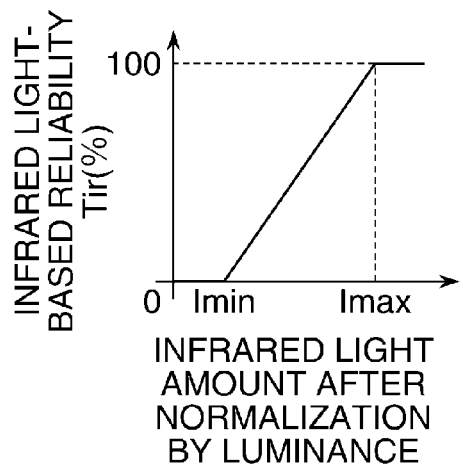
Figure 7F:
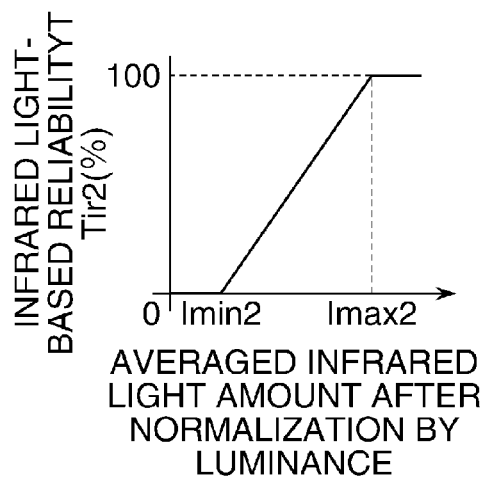
Figure 7G:
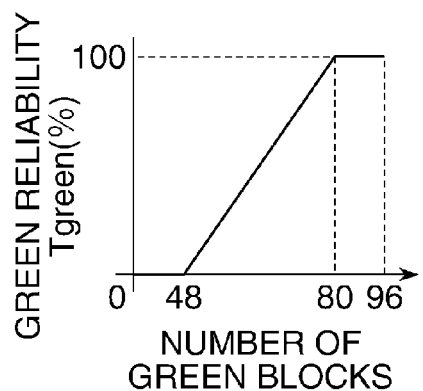
Figure 7H:
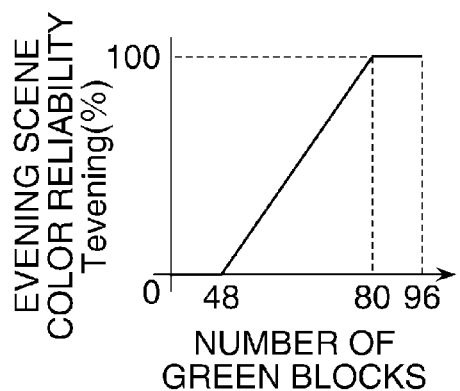

FIGS. 7A to 7H are diagrams useful in explaining tables used for reliability calculation performed by the WB controller 200 shown in FIG. 2, in which FIG. 7A shows a table for use in calculating the ratio-based reliability, FIG. 7B shows a table for use in calculating a distance-based reliability, FIG. 7C shows a table for use in calculating a color reliability, FIG. 7D shows a table for use in calculating a luminance-based reliability, FIG. 7E shows an example of a table for use in calculating an infrared light-based reliability, and FIG. 7F shows another example of the table for use in calculating the infrared light-based reliability. In addition, FIG. 7G shows a table for use in calculating a green reliability, and FIG. 7H shows a table for use in calculating an evening scene color reliability.

In calculating the ratio-based reliability Tratio, the white-based WB correction value reliability calculation section 204 refers to the table shown in FIG. 7A (ratio-based reliability table) to thereby calculate the ratio-based reliability Tratio (%).

In FIG. 7A, the horizontal axis represents the number of white blocks, and the vertical axis represents the ratio-based reliability Tratio (%). Note that in the illustrated example, the total number of blocks is 96 blocks, which is given only by way of example, but the total number of blocks is not limited to the illustrated example. That is, the ratio-based reliability table is only required to be configured such that as the ratio of the white block is larger, the ratio-based reliability Tratio (%) becomes higher.

Then, the white-based WB correction value reliability calculation section 204 determines a point of coordinates 503 in the R/G-B/G coordinate plane shown in FIG. 5, according to the R gain W_WB_Rgain and B gain W_WB_Bgain of the white-based WB correction value calculated in the step S402, by the following equations (2A) and (2B):

$$R/G \text{ corresponding to the white-based WB correction value} = 1/W\_WB\_Rgain \quad (2A)$$

$$B/G \text{ corresponding to the white-based WB correction value} = 1/W\_WB\_Bgain \quad (2B)$$

Then, the white-based WB correction value reliability calculation section 204 calculates a distance-based reliability Tdist (%) based on the table shown in FIG. 7B (distance-based reliability table) according to a shortest distance 504 between the point of the (R/G, B/G) coordinates 503 corresponding to the white-based WB correction value and the blackbody radiation locus 501 (step S602).

In FIG. 7B, the horizontal axis represents the shortest distance 504 between the point of the (R/G, B/G) coordinates 503 corresponding to the white-based WB correction value and the blackbody radiation locus 501, and the vertical axis represents the distance-based reliability Tdist dependent on a distance from the blackbody radiation locus 501. The distance-based reliability table is only required to be configured such that as the shortest distance between the point of the (R/G, B/G) coordinates 503 corresponding to the white-based WB correction value and the blackbody radiation locus 501 is smaller, the distance-based reliability Tdist becomes higher. The minimum distance Dmin and the maximum distance Dmax in FIG. 7B are set as desired. As the point of the (R/G, B/G) coordinates 503 is closer to the blackbody radiation locus 501, it indicates that there is a higher possibility that an achromatic color not under the light from a mercury lamp but under natural light is detected.

Next, the white-based WB correction value reliability calculation section 204 calculates a white-based WB correction value reliability Twhite by multiplying the ratio-based reliability Tratio by the distance-based reliability Tdist by the following equation (3) (step S603):

$$T\text{white} = T\text{ratio} \times T\text{dist}/100 \quad (3)$$

Then, the white-based WB correction value reliability calculation section 204 terminates the white-based WB correction value reliability calculation process, and the CPU 103 returns to the WB correction value calculation process in FIG. 4.

Next, the CPU 103 performs determination of the white-based WB correction value reliability Twhite (step S404). In this step, if the white-based WB correction value reliability Twhite is not lower than a predetermined threshold value, the CPU 103 determines that an achromatic color is detected under natural light and the reliability Twhite is high. On the other hand, if the white-based WB correction value reliability Twhite is lower than the predetermined threshold value, the CPU 103 determines that the reliability Twhite is low.

If the reliability Twhite is high (high reliability in the step S404), the CPU 103 terminates the WB correction value calculation process, and proceeds to the step S314 in FIG. 3. Then, the CPU 103 controls the image processing device 107 to convert the RAW data stored in the primary storage device 104 to image data according to the white-based WB correction value.

On the other hand, if the reliability Twhite is low (low reliability in the step S404), the CPU 103 controls the color determination section 205, the luminance determination section 206, the infrared light amount determination section 207, the RGB value addition section 208, and the infrared light-based WB correction value reliability calculation section 211 to perform processes described hereafter.

In these processes, first, green detection is performed based on infrared light determination under the control of the CPU 103 (step S405). More specifically, the image represented by the RAW data stored in the primary storage device 104 is divided into a predetermined number of blocks in the same manner as performed by the block dividing section 201. Next, it is determined whether the color of a block determined to be green is a color influenced by the light source, such as a mercury lamp, or a color of the object, based on the infrared light amount detected from the same area (i.e. block) by the infrared light sensor 106. Then, only the green determined to be a color of the object is set to an object to be subjected to calculation of green detection integrated values RintegA, GintegA, and BintegA, referred to hereinafter.

Figure 8A:
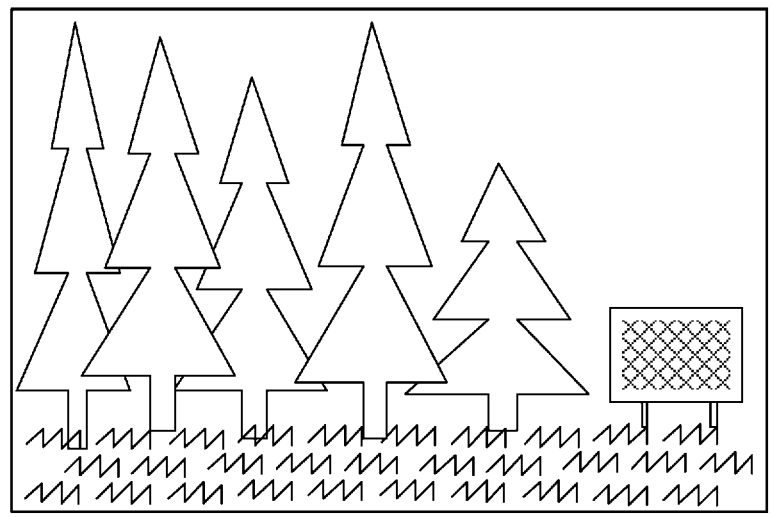
Figure 8B:
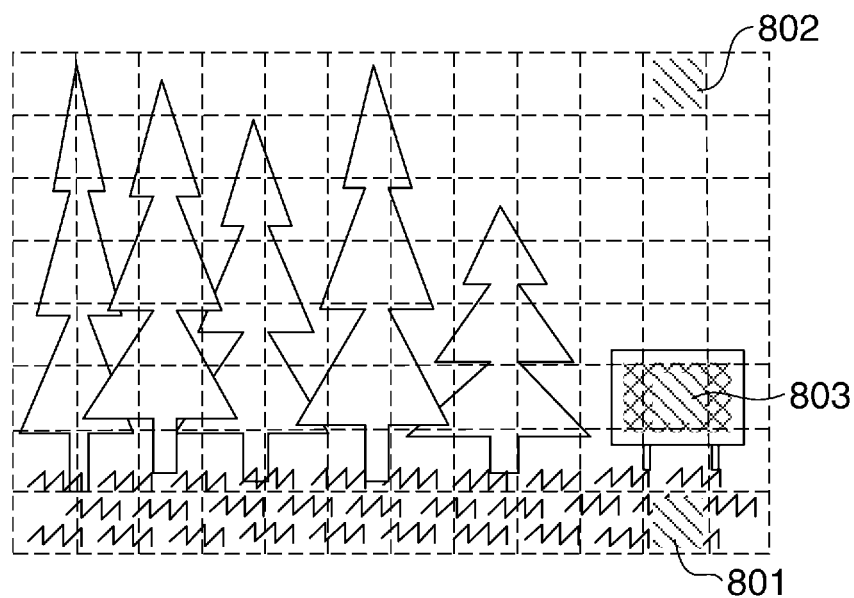

FIGS. 8A and 8B are diagrams useful in explaining the infrared light determination-based green detection performed in the step S405 of the WB correction value calculation process in FIG. 4. FIG. 8A shows an example of an image represented by RAW data, and FIG. 8B shows a state in which the image shown in FIG. 8A is divided into a predetermined number of blocks.

Referring to FIG. 8B, reference numeral 801 denotes a block of green grass, and reference numeral 802 denotes a block of the blue sky. Further, reference numeral 803 denotes a block of a white signboard. Now, assuming that the image shown in FIG. 8A is obtained by photographing under natural light, since the sun light includes infrared light, the block of green grass 801 is determined to show a color of the object because the infrared light is reflected from the block, and hence the block 801 is set to an object to be subjected to the calculation of the green detection integrated values RintegA, GintegA, and BintegA. The blue sky block 802 and the white signboard block 803 are not green, and hence these blocks are not set to objects to be subjected to the calculation of the green detection integrated values RintegA, GintegA, and BintegA.

On the other hand, assuming that the image shown in FIG. 8A is obtained by photographing under a mercury lamp in the night, the white signboard block 803 is influenced by the color of light from the mercury lamp, and is sometimes determined to be green. Further, the green grass block 801 is also influenced by the color of light from the mercury lamp, and hence the block 801 becomes a color different from the original green. In this case, since the light from the mercury lamp does not include infrared light, the respective colors of the green grass block 801 and the white signboard block 803 are determined to be influenced by the light from the mercury lamp. As a result, although these blocks are green, they are not set to objects to be subjected to the calculation of the green detection integrated values RintegA, GintegA, and BintegA.

Figure 9:
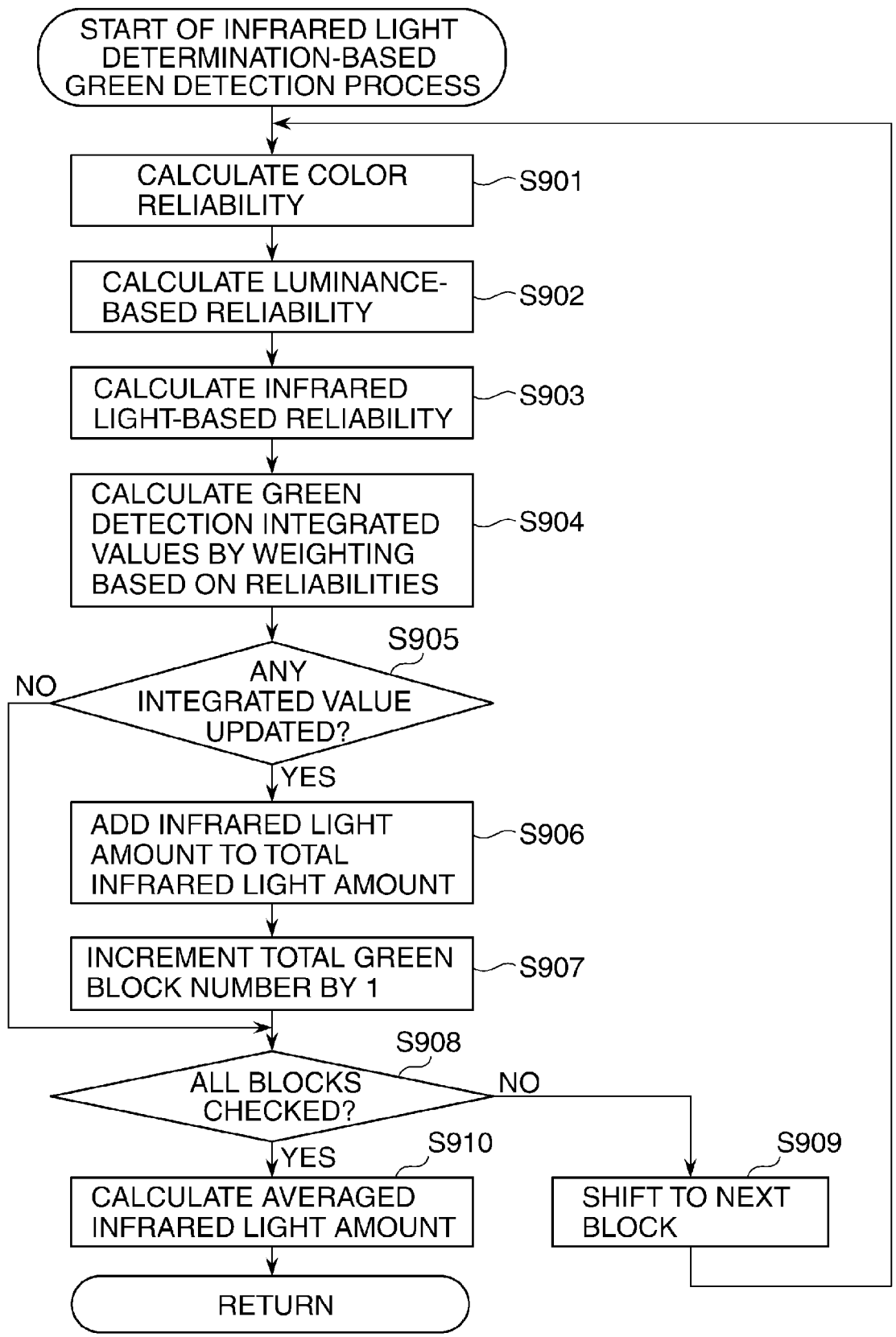
FIG. 9 is a flowchart of an infrared light determination-based green detection process performed in the step of the WB correction value calculation process in FIG. 4.

FIG. 9 is a flowchart of an infrared light determination-based green detection process performed in the step S405 of the WB correction value calculation process in FIG. 4.

The color determination section 205 extracts a color included in a green detection area (color detection frame) set in advance, and calculates a color reliability Tcolor by referring to the table shown in FIG. 7C (color reliability table) (step S901).

In FIG. 7C, the horizontal axis represents (R/G, B/G) coordinates corresponding to the color of each block, and the vertical axis represents the color reliability Tcolor. In FIG. 7C, as described hereinafter, an area 1002 in which the color reliability is 100% (see FIG. 10A) is provided inside the green detection area denoted by reference numeral 1001 (see FIG. 10A), and when a block is not included in the green detection area 1001, the color reliability of the block is set to 0%. Further, when a block is included in the green detection area 1001, and is also included in the area 1002 in which the color reliability is 100%, the color reliability of the block is set to 100%. Further, in a case where a block is included in the green detection area 1001, but is not included in the area 1002 in which the color reliability is 100%, the color reliability Tcolor is calculated by linear interpolation such that it is gradually changed according to the infrared light amount.

Note that the area 1002 in which the color reliability is 100% is set inside the green detection area 1001, by way of example, but this is not limitative. That is, the color reliability Tcolor may be set to be higher as the block is closer to the central portion of the green detection area 1001. By thus taking into account the color reliability Tcolor, it is possible to reduce a very large difference in the WB correction value caused by variation in color.

Next, the luminance determination section 206 calculates a luminance-based reliability Tlumi based on the object luminance detected by the photometry sensor 105, by referring to the table shown in FIG. 7D (luminance-based reliability table), so as to determine whether or not the color of the object is bright enough to calculate the color reliability Tcolor (step S902).

In FIG. 7D, the horizontal axis represents (R/G, B/G) coordinates corresponding to the object luminance of each block and the vertical axis represents the luminance-based reliability Tlumi. The luminance-based reliability table in FIG. 7D is configured such that the luminance-based reliability Tlumi is higher as the object luminance is higher. By thus taking into account the luminance-based reliability Tlumi, it is possible to positively prevent such erroneous determination that an image of a night scene or the like which is very dark is determined as photographed under natural light.

Then, the infrared light amount determination section 207 calculates an infrared light-based reliability Tir, based on the infrared light amount detected by the infrared light sensor 106, by referring to the table shown in FIG. 7E (infrared light-based reliability table) (step S903). The infrared light-based reliability Tir is a reliability indicating, for example, which of a possibility that an achromatic object has been photographed under the green light from a light source, such as a mercury lamp, and a possibility that green plant has been photographed under natural light, is higher.

Note that variation in infrared light amount, caused by changes in brightness, can be suppressed by normalizing the infrared light amount by the object luminance detected by the photometry sensor 105 and thereby using a ratio of the infrared light amount to the object luminance.

Referring to FIG. 7E, if the infrared light amount is smaller than the minimum value Imin, the color of the block is regarded as influenced by the light from the light source, whereas if the infrared light amount is larger than the maximum value Imax, the color of the block is regarded as the color of the object. Further, in a case where the infrared light amount is between the minimum value Imin and the maximum value Imax, the infrared light-based reliability Tir is set by linear interpolation such that it is progressively changed according to the infrared light amount.

Next, the RGB value addition section 208 performs weighted integration with respect to each of the R, G, and B signal values of a block as a processing target, according to the color reliability Tcolor, the luminance-based reliability Tlumi, and the infrared light-based reliability Tir, by the following equations (4A) to (4C) (step S904):

$$RintegA = RintegA + Rij \times (Tcolor/100 \times Tlumi/100 \times Tir/100) \quad (4A)$$

$$GintegA = GintegA + Gij \times (Tcolor/100 \times Tlumi/100 \times Tir/100) \quad (4B)$$

$$BintegA = BintegA + Bij \times (Tcolor/100 \times Tlumi/100 \times Tir/100) \quad (4C)$$

wherein Rij represents the integrated value of an R signal value in an i-th/j-th block, Gij represents the integrated value of a G signal value in an i-th/j-th block, and Bij represents the integrated value of a B signal value in an i-th/j-th block. Note that i represents a block number of each block in the horizontal direction (any of 0 to 11), and j represents a block number of the same in the vertical direction (any of 0 to 7).

The integrated values (i.e. added values) thus calculated by weighted integration are the aforementioned green detection integrated values RintegA, GintegA, and BintegA, respectively. Note that the green detection integrated values RintegA, GintegA, and BintegA are initialized to 0 only once before processing a first block.

Figure 10A:
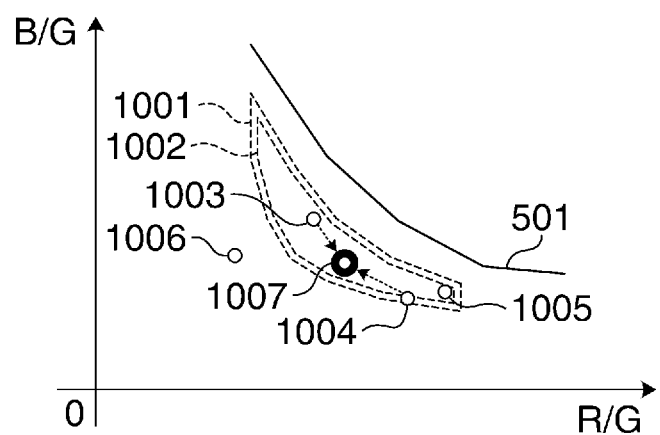
Figure 10B:
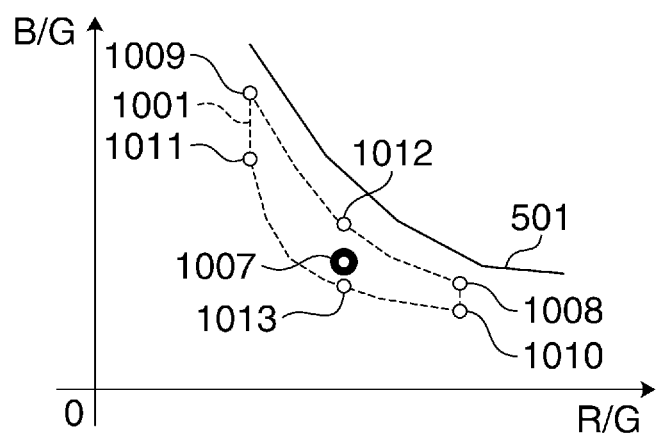
Figure 10C:
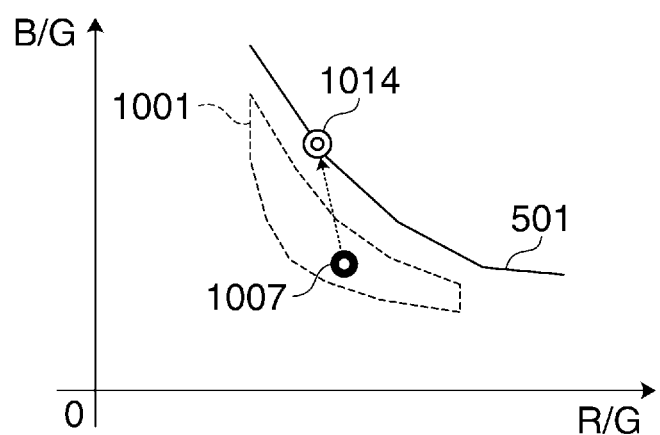
Figure 10D:
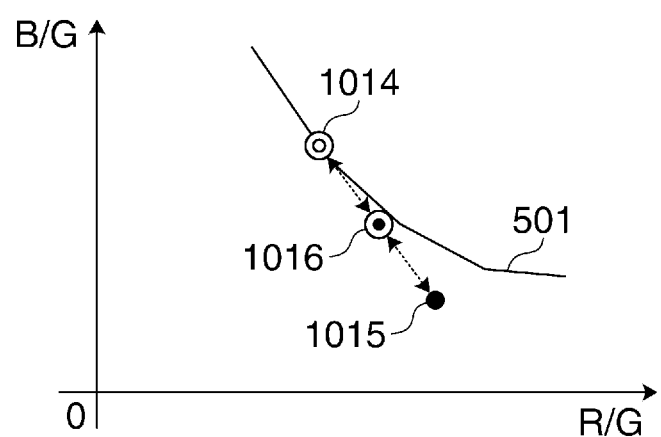

FIGS. 10A to 10D are diagrams useful in explaining calculation of the WB correction value, which is performed by the WB controller 200 shown in FIG. 2, in which FIG. 10A is a diagram useful in explaining green detection based on infrared light determination, FIG. 10B is a diagram useful in explaining color temperature estimation based on green detection, FIG. 10C is a diagram useful in explaining WB correction value calculation based on color temperature estimation, and FIG. 10D is a diagram useful in explaining calculation of a final WB correction value based on the white-based WB correction value and the infrared light-based WB correction value.

Referring to FIG. 10A, there is shown a (R/G, B/G) coordinate plane in which the horizontal axis represents the ratio R/G and the vertical axis represents the ratio B/G, and the blackbody radiation locus 501 is illustrated so as to make it easy to grasp a positional relationship between colors on the coordinate plane. An example of the position of a color which is high in all reliabilities, in the (R/G, B/G) coordinate plane, is denoted by reference numeral 1003. An example of the position of a color which is included in the green detection area 1001 but is not included in the area 1002 where the color reliability is 100%, i.e. which is lower in color reliability Tcolor, in the (R/G, B/G) coordinate plane, is denoted by reference numeral 1004. Further, an example of the position of a color which is lower in luminance-based reliability Tlumi or infrared light-based reliability Tir, in the (R/G, B/G) coordinate plane, is denoted by reference numeral 1005, and an example of the position of a color which is not included in the green detection area 1001, in the (R/G, B/G) coordinate plane, is denoted by reference numeral 1006. Further, a position of the (R/G, B/G) coordinates, which corresponds to the green detection integrated values RintegA, GintegA, and BintegA, i.e. a position of (RintegA/GintegA, BintegA/GintegA) coordinates is denoted by reference numeral 1007.

First, the color at the position 1003, which is high in all reliabilities, satisfies all required conditions, and hence the value of the color is added as it is. On the other hand, the color at the position 1004 is lower in color reliability Tcolor, and hence a value obtained by multiplying the value of the color by an addition ratio of e.g. 0.5 is added. Note that the addition ratio of a color is determined according to a position of the color in an area which is within the green detection area 1001 but outside the area 1002 in which the color reliability is 100%, in the (R/G, B/G) coordinate plane.

Next, as for the color corresponding to the position 1005 which is low in luminance-based reliability Tlumi or infrared light-based reliability Tir, if the luminance-based reliability Tlumi and infrared light-based reliability Tir are both not lower than a predetermined threshold value, a value obtained by multiplying the value of the color by a predetermined addition ratio is added, but if at least one of these reliabilities is lower than the predetermined threshold value, the value of the color is not added even when the color 1005 is included in the green detection area 1001. Finally, as for the color corresponding to the position 1006 which is not included in the green detection area 1001, even if both of the luminance-based reliability Tlumi and infrared light-based reliability Tir are high, the value of the color is not added, i.e. not integrated.

Referring again to FIG. 9, the CPU 103 determines whether or not at least one of the green detection integrated values RintegA, GintegA, and BintegA has been updated (step S905). If at least one of the green detection integrated values RintegA, GintegA, and BintegA has been updated (YES to the step S905), the CPU 103 determines that the color of the block is the color of the object. Then, to calculate an averaged infrared light amount in blocks from which the color of the object is detected, the infrared light-based WB correction value reliability calculation section 211 adds an infrared light amount IRij after being normalized by a luminance of the block, to a total infrared light amount IRtotal, by the following equation (5) (step S906):

$$IRtotal=IRtotal+IRij \quad (5)$$

wherein IRij represents an infrared light amount in an i-th and j-th block after being normalized by a luminance value detected of the block. Note that, as mentioned hereinabove, i represents a block number of each block in the horizontal direction (any of 0 to 11), and j represents a block number of the same in the vertical direction (any of 0 to 7).

Note that normalization processing performed in this step is processing for dividing the infrared light amount in the block by a luminance value detected of the block by the photometry sensor 105. Further, the total infrared light amount IRtotal is initialized to 0 only once before processing the first block.

Next, to calculate a ratio Nratio (referred to hereinafter) of the number of blocks from which the color of the object is detected to the number of blocks of the whole image, the infrared light-based WB correction value reliability calculation section 211 counts up a total green block number Ntotal by the following equation (6) (step S907):

$$Ntotal=Ntotal+1 \quad (6)$$

Note that the total number of green blocks Ntotal is initialized to 0 only once before processing the first block.

Then, the CPU 103 determines whether or not all the divided blocks have been checked (step S908). Note that unless at least one of the green detection integrated values RintegA, GintegA, and BintegA has been updated (NO to the step S905), the CPU 103 determines that the color of the object is not detected, and proceeds to the step S908.

If all the blocks have not been checked (NO to the step S908), the CPU 103 shifts processing to the next block (step S909), and returns to the step S901. On the other hand, if all the blocks have been checked (YES to the step S908), the infrared light-based WB correction value reliability calculation section 211 calculates an averaged infrared light amount IRave of the blocks from which the color of the object is detected, by the following equation (7) according to the total infrared light amount IRtotal and the total number of green blocks Ntotal (step S910). Then, the CPU 103 returns to the WB correction value calculation process in FIG. 4.

$$IRave=IRtotal/Ntotal \quad (7)$$

A process for adding the white-based WB correction value and the infrared light-based WB correction value is performed, as will be described hereinafter with reference to FIG. 12, using the R, G, and B integrated values RintegA, GintegA, and BintegA, calculated by the above-described processing, of the blocks determined to have the color of the object, the ratio Nratio, calculated by the following equation (8), of the number of blocks determined to have the color of the object to the number of blocks of the whole image, and the averaged infrared light amount IRave of the blocks determined to have the color of the object.

$$Nratio=Ntotal/\text{total number of blocks} \times 100 \quad (8)$$

wherein the total number of blocks, in the illustrated example, is equal to 12×8=96.

Referring again to FIG. 4, the light source color estimation section 209 estimates the color temperature of light from the light source used in photographing, i.e. natural light, based on the coordinates of the position 1007 in FIG. 10B, which corresponds to the green detection integrated values RintegA, GintegA, and BintegA (step S406).

FIG. 11 is a flowchart of a green detection-based color temperature estimation process performed in the step S406 of the WB correction value calculation process in FIG. 4.

Referring to FIGS. 10B and 11, in FIG. 10B, similar to FIG. 10A, there is shown the (R/G, B/G) coordinate plane in which the horizontal axis represents the ratio R/G and the vertical axis represents the ratio B/G, and the blackbody radiation locus 501 is illustrated so as to make it easy to grasp a positional relationship between colors on the coordinate plane. It is assumed that points at the corners of the green detection area 1001, denoted by reference numerals 1008 to 1011, each hold a reciprocal color temperature of light from a light source. Further, the points 1008 and 1010 are in a low color temperature area, and the points 1009 and 1011 are in a high color temperature area.

When the color temperature estimation process is started, the light source color estimation section 209 calculates a reciprocal color temperature of light from the light source at a point 1012 corresponding to the R/G component of the green detection integrated values RintegA, GintegA, and BintegA, by performing linear interpolation using the reciprocal color temperature of light from the light source corresponding to the point 1008 in the low color temperature area and the reciprocal color temperature of light from the light source corresponding to the point 1009 in the high color temperature area (step S1101).

Then, the light source color estimation section 209 calculates a reciprocal color temperature of light from the light source at a point 1013 corresponding to the R/G component of the green detection integrated values RintegA, GintegA, and BintegA, by performing linear interpolation using the reciprocal color temperature of light from the light source corresponding to the point 1010 in the low color temperature area and the reciprocal color temperature of light from the light source corresponding to the point 1011 in the high color temperature area (step S1102).

The light source color estimation section 209 calculates a reciprocal color temperature of light from the light source corresponding to the B/G component of the green detection integrated values RintegA, GintegA, and BintegA, by performing linear interpolation using the reciprocal color temperature of light from the light source corresponding to the point 1012 and the reciprocal color temperature of light from the light source corresponding to the point 1013 (step S1103).

Then, the light source color estimation section 209 converts the reciprocal color temperature of light from the light source, calculated in the step S1103, to a color temperature (step S1104). Then, the light source color estimation section 209 terminates the color temperature estimation process, and the CPU 103 returns to the WB correction value calculation process in FIG. 4.

Using the color temperature of light from the light source at the point 1007 of the coordinates corresponding to the green detection integrated values RintegA, GintegA, and BintegA, obtained by the above-described color temperature estimation process, processing described hereafter is performed.

Referring to FIGS. 4 and 10C, the infrared light-based WB correction value calculation section 210 calculates a WB correction value (infrared light-based WB correction value) corresponding to the color temperature of light from the light source estimated in the step S406 (step S407).

In FIG. 10C, similar to FIGS. 10A and 10B, there is shown the (R/G, B/G) coordinate plane in which the horizontal axis represents the ratio R/G and the vertical axis represents the ratio B/G, and the blackbody radiation locus 501 is illustrated so as to make it easy to grasp a positional relationship between colors on the coordinate plane. Here, assuming that a green object including infrared light is detected and hence the object can be determined to be photographed under natural light, the infrared light-based WB correction value calculation section 210 calculates the (RGg, BGg) coordinates of a point corresponding to the color temperature on the blackbody radiation locus 501. Then, the infrared light-based WB correction value calculation section 210 calculates infrared light-based WB correction value 1014 corresponding to the calculated coordinates by the following equations (9A) to (9C):

$$\text{infrared light-based WB correction value } R \text{ gain}$$
$$\text{IR\_WB\_Rgain}=1/RGg \quad (9A)$$

$$\text{infrared light-based WB correction value } G \text{ gain}$$
$$\text{IR\_WB\_Ggain}=1 \quad (9B)$$

$$\text{infrared light-based WB correction value } B \text{ gain}$$
$$\text{IR\_WB\_Bgain}=1/BGg \quad (9C)$$

Using the infrared light-based WB correction value 1014 calculated as above and the white-based WB correction value, the following process for adding the white-based WB correction value and the infrared light-based WB correction value is performed. Here, the WB correction value addition ratio calculation section 212 and the mixed WB correction value calculation section 213 add the white-based WB correction value and the infrared light-based WB correction value at a predetermined ratio, to thereby calculate the final WB correction value (mixed WB correction value) (step S408).

Figure 12:
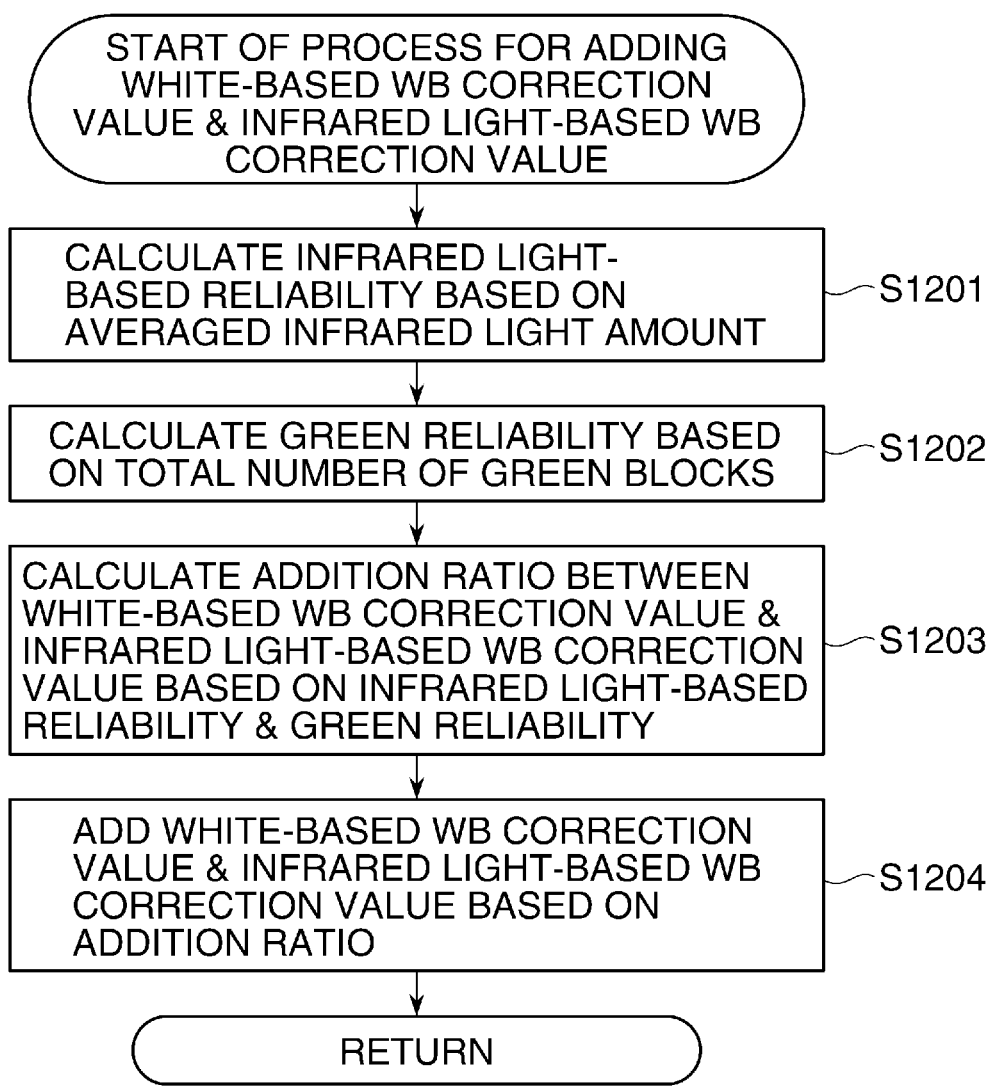
FIG. 12 is a flowchart of a process for adding the white-based WB correction value and the infrared light-based WB correction value, which is performed in a step of the WB correction value calculation process in FIG. 4.

FIG. 12 is a flowchart of the process for adding the white-based WB correction value and the infrared light-based WB correction value, which is performed in the step S408 of the WB correction value calculation process in FIG. 4.

Referring to FIGS. 10D and 12, in FIG. 10D, similar to FIGS. 10A to 10C, there is shown the (R/G, B/G) coordinate plane in which the horizontal axis represents the ratio R/G and the vertical axis represents the ratio B/G, and the blackbody radiation locus 501 is illustrated so as to make it easy to grasp a positional relationship between colors on the coordinate plane. When the addition process is started, the WB correction value addition ratio calculation section 212 calculates an infrared light-based reliability Tir2 based on the averaged infrared light amount IRave of the blocks determined, in the step S405, to have the color (green) of the object (step S1201).

Note that the infrared light-based reliability Tir2 is calculated by referring to the table shown in FIG. 7F (infrared light-based reliability table). However, since this table is similar to the table shown in FIG. 7E, description thereof is omitted.

Then, the WB correction value addition ratio calculation section 212 calculates a green reliability Tgreen based on the ratio Nratio of the number of the blocks determined, in the step S405, to have the color (green) of the object to the number of all blocks (step S1202).

Note that the green reliability Tgreen is calculated by referring to the table shown in FIG. 7G (green reliability table). However, since this table is similar to the table shown in FIG. 7A, description thereof is omitted. Further, in the table shown in FIG. 7G, the values on the horizontal axis are indicated, by way of example, but the numbers of green blocks are not limited thereto. That is, the green reliability table is only required to be configured such that as the ratio of the number of blocks determined to have the color (green) of the object is larger, the green reliability Tgreen becomes higher.

Next, based on the infrared light-based reliability Tir2 and the green reliability Tgreen, the WB correction value addition ratio calculation section 212 calculates an addition ratio Ratio_W_IR between the white-based WB correction value and the infrared light-based WB correction value, by the following equation (10) (step S1203):

$$\text{Ratio\_}W\_\text{IR}=Tir2\times T\text{green}/100 \quad (10)$$

Note that in the step S1203, the addition ratio Ratio_W_IR may be calculated by taking into account the reliability of the white-based WB correction value calculated in the above-described step S403. Further, the addition ratio Ratio_W_IR may be set such that one of the white-based WB correction value and the infrared light-based WB correction value is used depending on the reliability.

Next, the mixed WB correction value calculation section 213 calculates a WB correction value (mixed WB correction value) WB_Rmix by adding together the white-based WB correction value and the infrared light-based WB correction value, by the following equation (11) using the addition ratio Ratio_W_IR (step S1204):

$$\text{WB\_}R\text{mix}=(\text{WB\_}Rw\times(100-\text{Ratio\_}W\_\text{IR})+\text{WB\_}Rir\times\text{Ratio\_}W\_\text{IR})/100 \quad (11)$$

wherein WB_Rw represents the R gain of the white-based WB correction value, WB_Rir represents the R gain of the infrared light-based WB correction value, and WB_Rmix represents the R gain of the mixed WB correction value.

Note that the G gain and the B gain of the mixed WB correction value are also calculated by a similar equation to the equation for calculating the R gain. Then, the CPU 103 returns to the WB correction value calculation process in FIG. 4.

In FIG. 10D, a point of (R/G, B/G) coordinates corresponding to the infrared light-based WB correction value is denoted by reference numeral 1014, and a point of (R/G, B/G) coordinates corresponding to the white-based WB correction value is denoted by reference numeral 1015. Further, a point of (R/G, B/G) coordinates corresponding to the mixed WB correction value is denoted by reference numeral 1016.

The coordinates of a point obtained by dividing a straight line connecting the point 1014 and the point 1015 according to the addition ratio Ratio_W_IR are set to the (R/G, B/G) coordinates of the point 1016 corresponding to the mixed WB correction value. With this processing, it is possible to smoothly shift a value between the white-based WB correction value and the infrared light-based WB correction value.

Then, the RAW data stored in the primary storage device 104 is converted to image data using the mixed WB correction value obtained as above.

As described above, in the first embodiment of the present invention, it is determined, on an image from which a large amount of a similar color is detected, whether the color of the image is the color of light from a light source or the color of an object. This makes it possible to properly perform the white balance control.

Next, a description will be given of a camera as an image pickup apparatus according to a second embodiment of the present invention.

The camera as the image pickup apparatus according to the second embodiment has the same configuration as that of the camera shown in FIG. 1, and the white balance controller included in the image processing device has the same configuration as shown in FIG. 2. Further, the photographing process performed by the camera according to the second embodiment is the same as the photographing process in FIG. 3 except the WB correction value calculation process.

The second embodiment will be described by taking an example in which the white balance control is performed by discriminating between a red object under the fluorescent lamp light and an evening scene.

Figure 13:
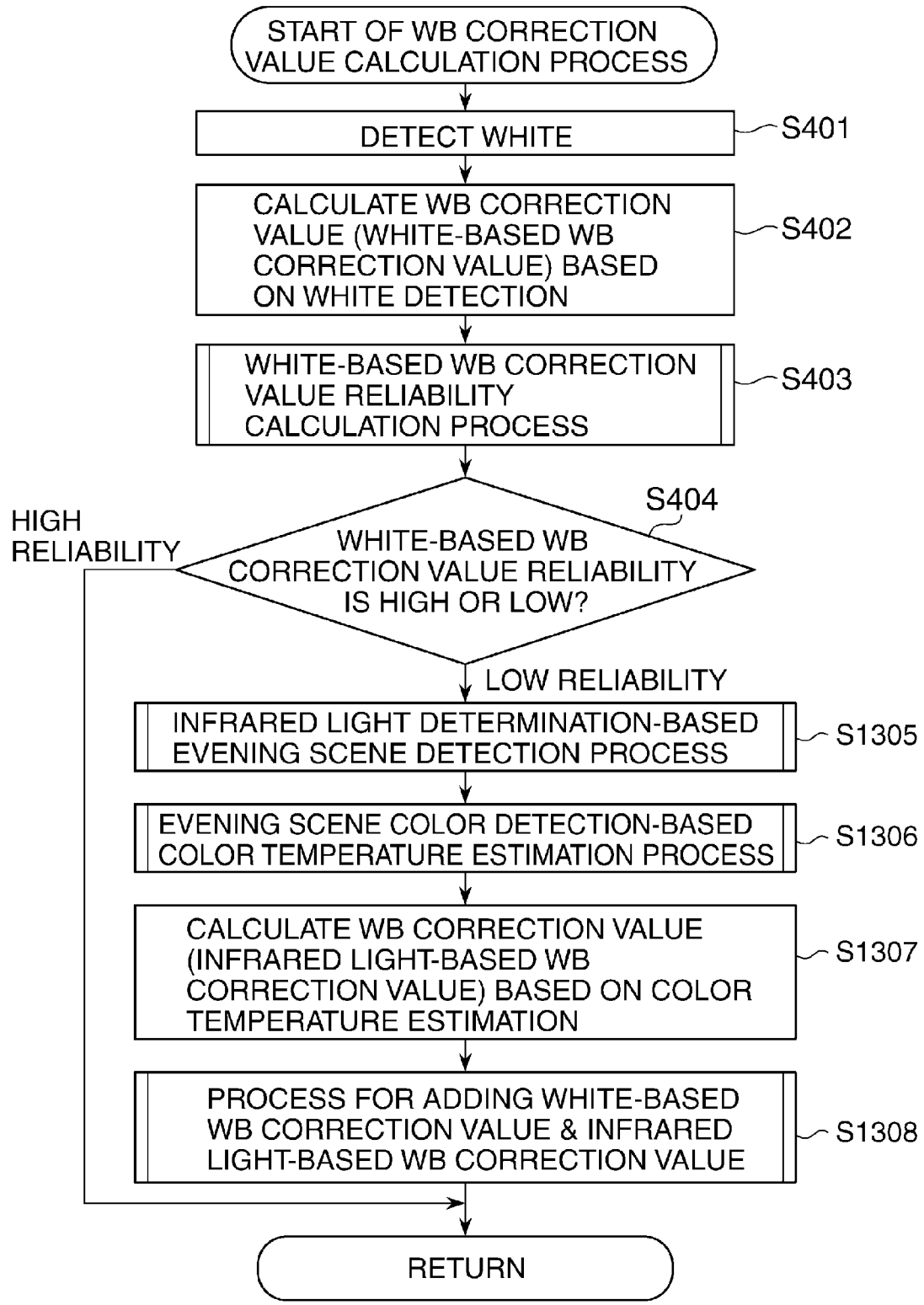
FIG. 13 is a flowchart of a WB correction value calculation process performed by an image pickup apparatus according to a second embodiment of the present invention.

FIG. 13 is a flowchart of the WB correction value calculation process performed by the image pickup apparatus according to the second embodiment.

Note that the WB correction value calculation process in FIG. 13 is performed under the control of the CPU 103. Further, in the WB correction value calculation process in FIG. 13, the same steps as those of the WB correction value calculation process in FIG. 4 are denoted by the same step numbers, and description thereof is omitted.

If it is determined in the step S404 that the reliability Twhite is low, the CPU 103 controls the color determination section 205, the luminance determination section 206, the infrared light amount determination section 207, the RGB value addition section 208, and the infrared light-based WB correction value reliability calculation section 211, to perform evening scene color detection based on infrared light determination (step S1305). In this step, an image represented by RAW data stored in the primary storage device 104 is divided into a predetermined number of blocks. Then, it is determined whether a block determined to have the same color as that of an evening scene (hereinafter referred to as the evening scene color) has a color of a red object or a color of the sky reddened by the setting sun. Then, signal values of only blocks of the evening scene color, which are determined to have the color of the sky reddened by the setting sun, are integrated.

Figure 14A:
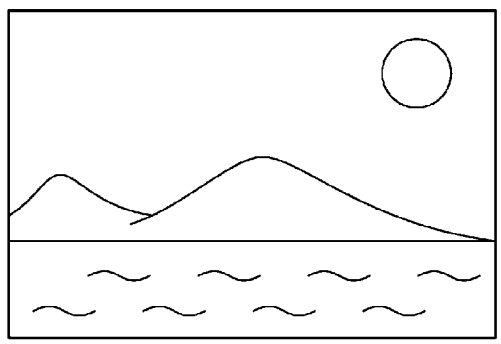
Figure 14B:
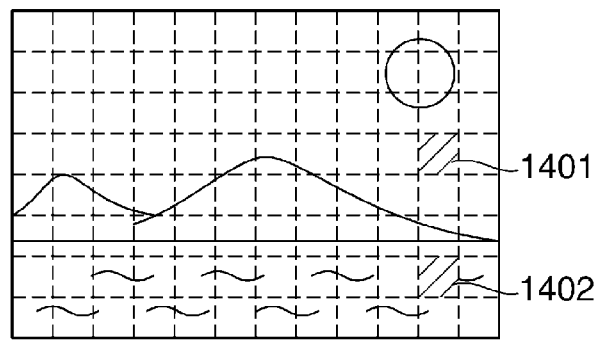
Figure 14C:
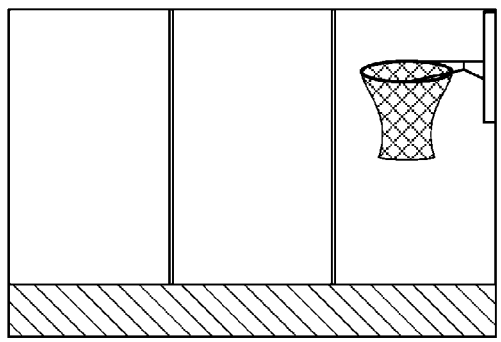
Figure 14D:
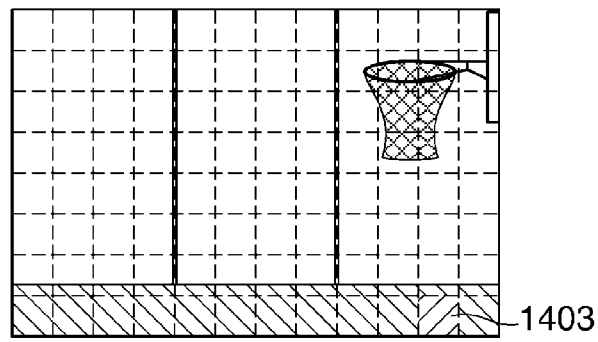

FIGS. 14A to 14D are diagrams useful in explaining the evening scene color detection process shown in FIG. 13. FIG. 14A shows an example of an image obtained by photographing an evening scene, and FIG. 14B shows a state in which the image shown in FIG. 14A is divided into a predetermined number of blocks. FIG. 14C shows an example of an image obtained by photographing the inside of a gymnasium, and FIG. 14D shows a state in which the image shown in FIG. 14C is divided into a predetermined number of blocks.

Referring to FIG. 14B, a block of the sky reddened by the setting sun is denoted by reference numeral 1401, and a block of the blue sea lit by the setting sun is denoted by reference numeral 1402. In the illustrated example in FIG. 14A, since the setting sun emits infrared light, the block 1401 of the sky reddened by the setting sun includes an infrared light component. Therefore, the block 1401 is determined to have the evening scene color, and the signal value thereof is a value to be integrated. The block 1402 of the blue sea lit by the setting sun does not have the evening scene color, and the signal value thereof is not to be integrated.

Referring to FIG. 14D, a wood floor of the gymnasium is denoted by reference numeral 1403. In the illustrated example in FIG. 14C, in a case where the color of the wood floor of the gymnasium lit by fluorescent lamp is similar to the evening scene color, it is sometimes erroneously determined to be an evening scene color. However, fluorescent lamps and like light sources do not emit infrared light, and hence in the present embodiment, the wood floor of the gymnasium is determined to be a red object, and the signal value of the flooring is a value not to be integrated.

Figure 15:
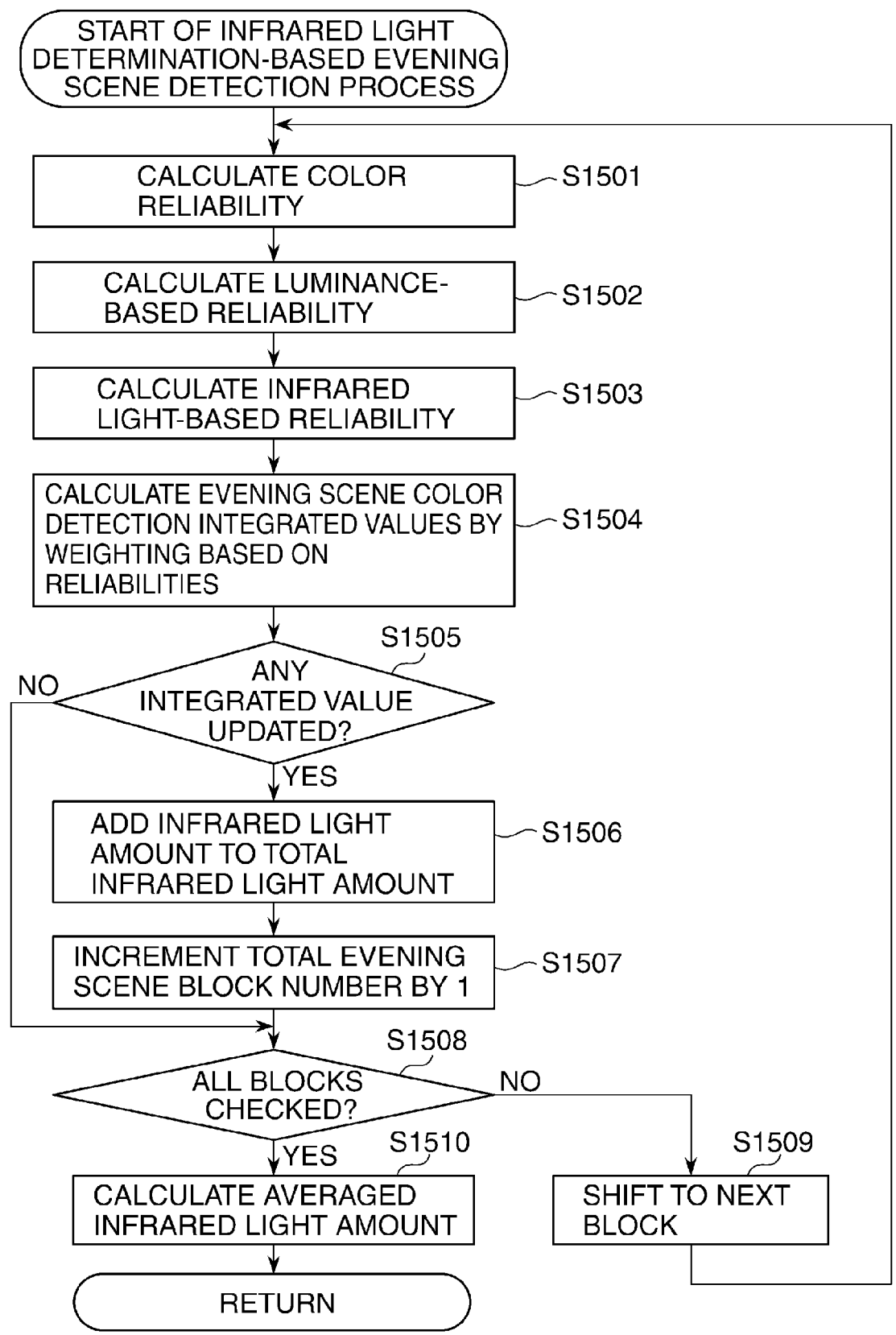
FIG. 15 is a flowchart of the evening scene color detection process performed in a step of the WB correction value calculation process in FIG. 13.

FIG. 15 is a flowchart of the evening scene color detection process performed in the step S1305 of the WB correction value calculation process in FIG. 13.

When the evening scene color detection process is started, the color determination section 205 extracts a color included in an evening scene color detection area set in advance, in the same manner as in the step S901 of the infrared light determination-based green detection process shown in FIG. 9. Then, the color determination section 205 calculates a color reliability Tcolor by referring to the table shown in FIG. 7C (step S1501).

Then, similar to the step S902 in FIG. 9, the luminance determination section 206 calculates the luminance-based reliability Tlumi based on the object luminance detected by the photometry sensor 105, by referring to the table shown in FIG. 7D (step S1502). Then, the infrared light amount determination section 207 calculates the infrared light-based reliability Tir based on the infrared light amount detected by the infrared light sensor 106 (step S1503). Here, the infrared light-based reliability Tir is a reliability indicating, for example, which of a possibility that a red object has been photographed indoors, e.g. in a gymnasium, and a possibility that the sky reddened by the setting sun has been photographed, is higher.

Note that as for the infrared light amount, similar to the first embodiment, variation in infrared light amount, caused by changes in brightness, can be suppressed by normalizing the infrared light amount by the object luminance detected by the photometry sensor 105 and thereby using a ratio of the infrared light amount to the object luminance.

Although the table shown in FIG. 7E is used in calculating the infrared light-based reliability Tir, in the present embodiment, differently from the first embodiment, when the infrared light amount is smaller than the minimum value Imin, the block is determined to have the color of the object. Further, when the infrared light amount is larger than the maximum value Imax, the block is determined to have the color influenced by the light from the light source.

Although in a broad sense, the evening scene color is also a color of the object, when the sun declines, the sunlight passes through the long air layer, whereby bluish light having high frequency is more dispersed, and as a result, the evening scene is reddened. Therefore, in the present embodiment, to discriminate between the color of a red object and the evening scene color, the evening scene color is determined to be a color influenced by light from a light source.

Note that in a case where the infrared light amount is between the minimum value Imin and the maximum value Imax, the infrared light-based reliability Tir is set by linear interpolation such that it is progressively changed according to the infrared light amount.

Then, in the same manner as in the step S904 in FIG. 9, the RGB value addition section 208 calculates evening scene color detection integrated values RintegA, GintegA, and BintegA based on the reliabilities, calculated in the steps S1501 to S1503, by the above-described equations (4A) to (4C) (step S1504).

Figure 16A:
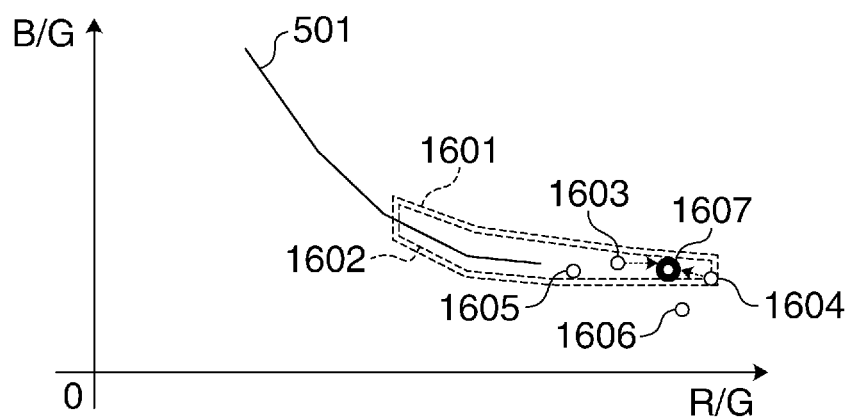
Figure 16B:
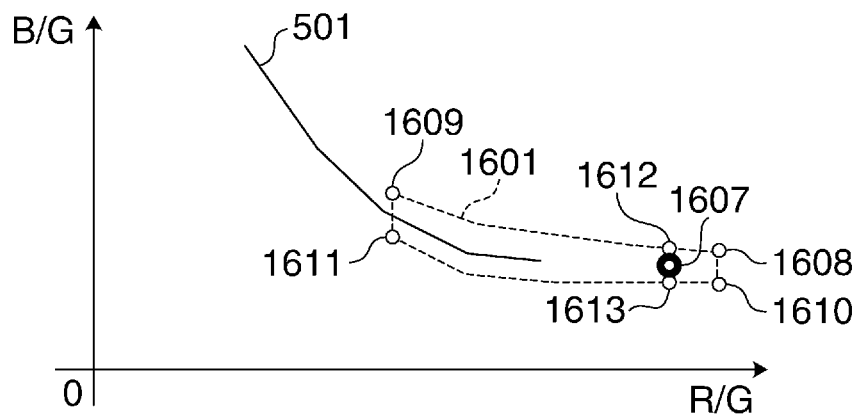
Figure 16C:
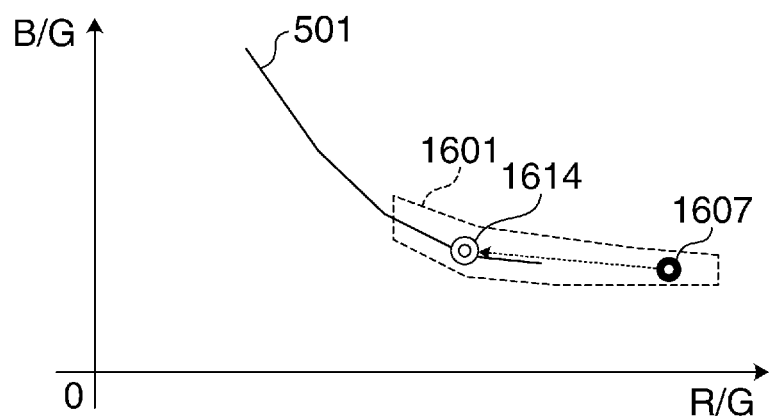
Figure 16D:
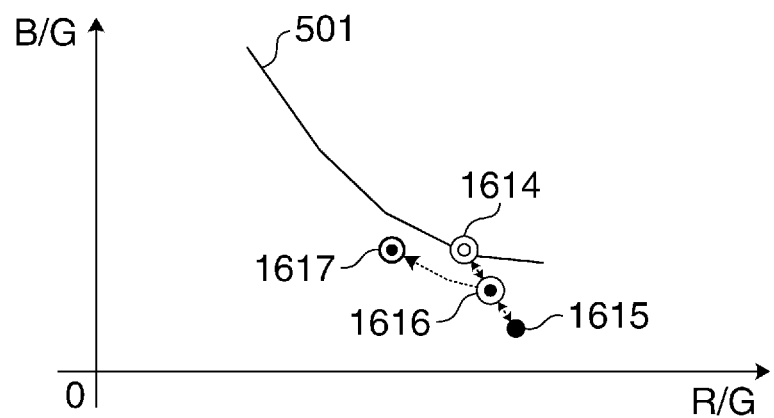

FIGS. 16A to 16D are diagrams useful in explaining calculation of the WB correction value, performed by the WB controller in the second embodiment. FIG. 16A is a diagram useful in explaining evening scene color detection based on infrared light determination, and FIG. 16B is a diagram useful in explaining color temperature estimation based on evening scene color detection. Further, FIG. 16C is a diagram useful in explaining WB correction value calculation based on color temperature estimation, and FIG. 16D is a diagram useful in explaining calculation of the final WB correction value based on the white-based WB correction value and the infrared light-based WB correction value.

Referring to FIG. 16A, similar to FIGS. 10A to 10D, there is shown the (R/G, B/G) coordinate plane in which the horizontal axis represents the ratio R/G and the vertical axis represents the ratio B/G, and the blackbody radiation locus 501 is illustrated so as to make it easy to grasp a positional relationship between colors on the coordinate plane. An area 1602 in which the color reliability is 100% is set inside an evening scene color detection area 1601, and this area 1602 is the same as the area 1002 in which the color reliability is 100%, set inside the green detection area 1001 appearing in FIG. 10A.

An example of a position of a color which is high in all reliabilities, in the (R/G, B/G) coordinate plane, is denoted by reference numeral 1603. An example of a position of a color which is included in the evening scene color detection area 1601 but is not included in an area 1602 where the color reliability is 100%, i.e. which is lower in color reliability Tcolor, in the (R/G, B/G) coordinate plane, is denoted by reference numeral 1604. Further, an example of a position of a color which is lower in luminance-based reliability Tlumi or infrared light-based reliability Tir, in the (R/G, B/G) coordinate plane, is denoted by reference numeral 1605, and an example of a position of a color which is not included in the evening scene color detection area 1601, in the (R/G, B/G) coordinate plane, is denoted by reference numeral 1006. Further, a position of the (R/G, B/G) coordinates which corresponds to the evening scene color detection integrated values RintegA, GintegA, and BintegA, i.e. a position of (RintegA/GintegA, BintegA/GintegA) coordinates is denoted by reference numeral 1607.

The positions 1603 to 1606 of the colors and the position 1607 of the (RintegA/GintegA, BintegA/GintegA) coordinates, in the (R/G, B/G) coordinate plane, are similar to the positions 1003 to 1006 of the colors and the position 1007 of the (RintegA/GintegA, BintegA/GintegA) coordinates, in the (R/G, B/G) coordinate plane, shown in FIG. 10A, and hence description thereof is omitted.

Then, the CPU 103 determines whether or not at least one of the evening scene color detection integrated values RintegA, GintegA, and BintegA has been updated in the same manner as in the step S905 in FIG. 9 (step S1505). If at least one of the evening scene color detection integrated values RintegA, GintegA, and BintegA has been updated (YES to the step S1505), i.e. if the block is determined to have the evening scene color, similar to the step S906 in FIG. 9, to calculate an averaged infrared light amount in blocks from which the evening scene color is detected, the infrared light-based WB correction value reliability calculation section 211 adds an infrared light amount IRij after being normalized by a luminance of the block to a total infrared light amount IRtotal by the equation (5) (step S1506). Note that normalization processing performed in this step is processing for dividing the infrared light amount in the block by a luminance value detected of the block by the photometry sensor 105.

Then, similar to the step S907 in FIG. 9, the infrared light-based WB correction value reliability calculation section 211 counts up a total evening scene block number Ntotal by the equation (6) so as to calculate a ratio Nratio of the number of blocks from which the evening scene color is detected to the number of blocks of the whole image (step S1507). Then, similar to the step S908 in FIG. 9, the CPU 103 determines whether or not all the blocks have been checked (step S1508).

If all the blocks have not been checked (NO to the step S1508), the CPU 103 shifts processing to the next block (step S1509), and returns to the step S1501. Note that if the evening scene color detection integrated values RintegA, GintegA, and BintegA have not been updated (NO to the step S1505), the CPU 103 proceeds to the step S1508.

If all the blocks have been checked (YES to the step S1508), similar to the step S910 in FIG. 9, the infrared light-based WB correction value reliability calculation section 211 calculates the averaged infrared light amount IRave of the blocks from which the evening scene color is detected, by the equation (7) according to the total infrared light amount IRtotal and the total number of evening scene blocks Ntotal (step S1510). Then, the CPU 103 returns to the WB correction value calculation process in FIG. 13.

A process for adding the white-based WB correction value and the infrared light-based WB correction value is performed, as will be described hereinafter with reference to FIG. 17, using the R, G, and B integrated values RintegA, GintegA, and BinteA, calculated by the above-described processing, of the blocks determined to have the evening scene color, the ratio Nratio, calculated by the equation (8), of the number of blocks determined to have the evening scene color to the number of blocks of the whole image, and the averaged infrared light amount IRave of the blocks determined to have the evening scene color.

Referring again to FIG. 13, similar to the step S406 in FIG. 4, the light source color estimation section 209 estimates the color temperature of the evening scene color based on the coordinates of the position 1607, which correspond to the evening scene color detection integrated values RintegA, GintegA, and BintegA (step S1306).

Color temperature estimation based on the evening scene color detection in the step S1306 is performed in the same manner as in the color temperature estimation process in FIG. 11, and hence description thereof is omitted.

In FIG. 16B, similar to FIG. 16A, there is shown the (R/G, B/G) coordinate plane in which the horizontal axis represents the ratio R/G and the vertical axis represents the ratio B/G, and the blackbody radiation locus 501 is illustrated so as to make it easy to grasp a positional relationship between colors on the coordinate plane. The illustrated example in FIG. 16B is similar to the example shown in FIG. 10B, and positions 1608 to 1613 of colors in the (R/G, B/G) coordinate plane correspond to the positions 1008 to 1013 of the colors in the (R/G, B/G) coordinate plane in FIG. 10B, and hence description thereof is omitted.

Then, similar to the step S407 in FIG. 4, the infrared light-based WB correction value calculation section 210 calculates the WB correction value (infrared light-based WB correction value) corresponding to the color temperature of evening scene color estimated in the step S1306 (step S1307).

In FIG. 16C, similar to FIGS. 16A and 16B, there is shown the (R/G, B/G) coordinate plane in which the horizontal axis represents the ratio R/G and the vertical axis represents the ratio B/G, and the blackbody radiation locus 501 is illustrated so as to make it easy to grasp a positional relationship between colors on the coordinate plane. The illustrated example in FIG. 16C is similar to the example shown in FIG. 10C, and the infrared light-based WB correction value, denoted by reference numeral 1614, corresponds to the infrared light-based WB correction value 1014, and hence description thereof is omitted.

Next, the WB correction value addition ratio calculation section 212 and the mixed WB correction value calculation section 213 adds the white-based WB correction value and the infrared light-based WB correction value at a predetermined ratio (step S1308). Then, the WB correction value obtained by addition is shifted by a predetermined value, whereby the final WB correction value is calculated.

Figure 17:
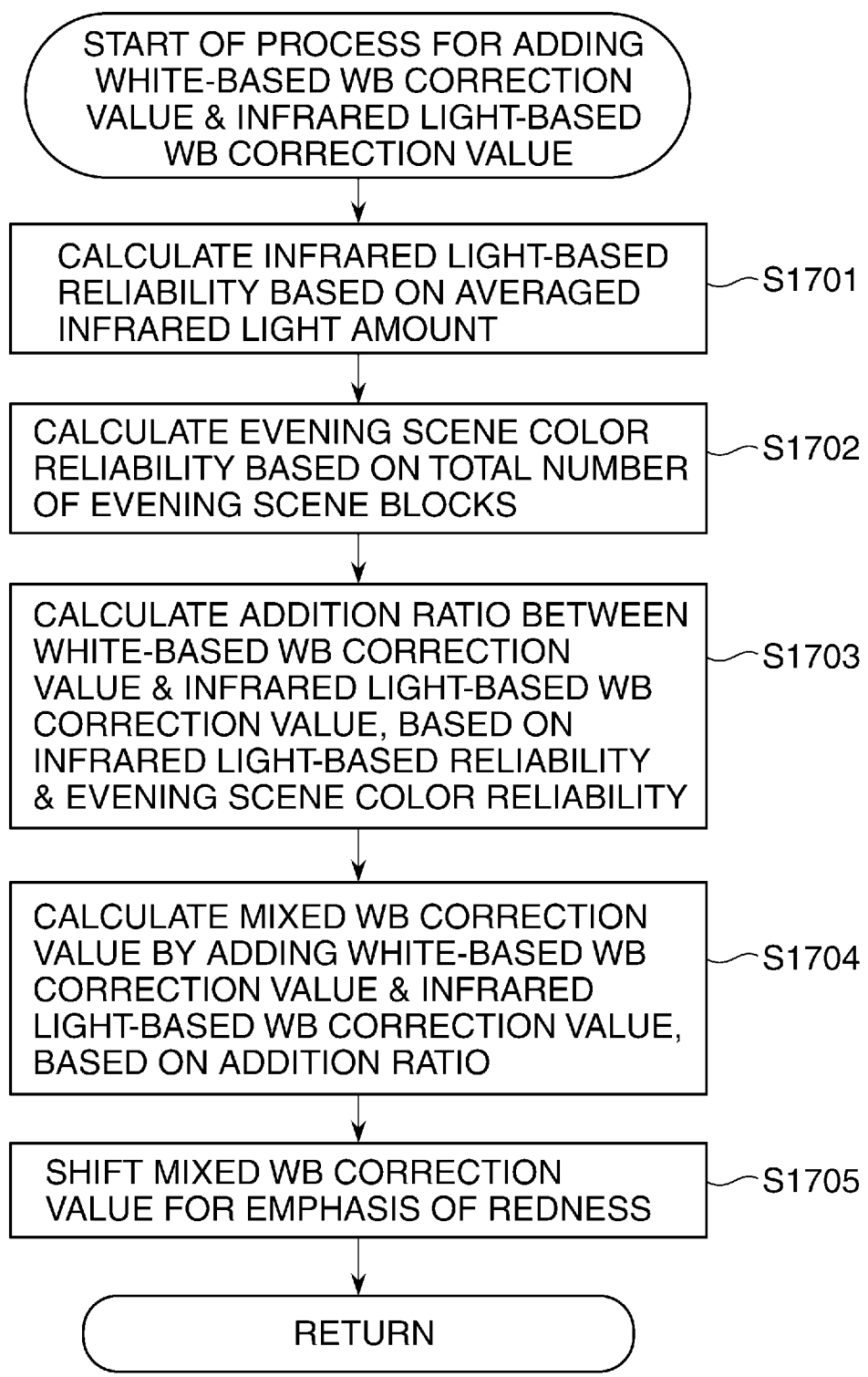
FIG. 17 is a flowchart of a process for adding the white-based WB correction value and the infrared light-based WB correction value, which is performed in a step of the WB correction value calculation process in FIG. 13.

FIG. 17 is a flowchart of the process for adding the white-based WB correction value and the infrared light-based WB correction value, executed in the step S1308 of the WB correction value calculation process in FIG. 13.

Referring to FIGS. 16D and 17, in FIG. 16D, similar to FIGS. 16A to 16C, there is shown the (R/G, B/G) coordinate plane in which the horizontal axis represents the ratio R/G and the vertical axis represents the ratio B/G, and the blackbody radiation locus 501 is illustrated so as to make it easy to grasp a positional relationship between colors on the coordinate plane. When the addition process is started, the WB correction value addition ratio calculation section 212 calculates the infrared light-based reliability Tir2 based on the averaged infrared light amount IRave of the blocks determined, in the step S1305, to have the evening scene color (step S1701).

Although the infrared light-based reliability Tir2 is calculated by referring to the table shown in FIG. 7F (infrared light-based reliability table), this table is similar to the table shown in FIG. 7E, and hence description thereof is omitted.

Then, the WB correction value addition ratio calculation section 212 calculates an evening scene color reliability Tevening based on the ratio Nratio of the number of blocks determined, in the step S1305, to have the evening scene color, to the number of all the blocks (step S1702).

Although the evening scene color reliability Tevening is calculated by referring to the table shown in FIG. 7H (evening scene color reliability table), this table is similar to the table shown in FIG. 7A, and hence description thereof is omitted. Further, in the table shown in FIG. 7H, the values on the horizontal axis are indicated, by way of example, but the numbers of evening scene color blocks are not limited thereto.

That is, the evening scene color reliability table is only required to be configured set such that as the ratio of the number of blocks determined to have the evening scene color is larger, the evening scene color reliability Tevening becomes higher.

Next, based on the infrared light-based reliability Tir2 and the evening scene color reliability Tevening, the WB correction value addition ratio calculation section 212 calculates an addition ratio Ratio_W_IR between the white-based WB correction value and the infrared light-based WB correction value by the following equation (12) (step S1703):

$$\text{Ratio\_W\_IR} = Tir2 \times Tevening/100 \qquad (12)$$

Note that in the step S1703, the addition ratio Ratio_W_IR may be calculated by taking into account the reliability of the white-based WB correction value calculated in the above-described step S1303. Further, the addition ratio Ratio_W_IR may be set such that one of the white-based WB correction value and the infrared light-based WB correction value is used depending on the reliability Next, the mixed WB correction value calculation section 213 calculates a WB correction value (mixed WB correction value) WB_Rmix by adding together the white-based WB correction value and the infrared light-based WB correction value, by the above-described equation (11) using the addition ratio Ratio_W_IR (step S1704). After that, the mixed WB correction value calculation section 213 shifts the calculated mixed WB correction value in a direction of emphasizing redness, by a predetermined value set in advance, to thereby calculate a WB correction value which emphasizes redness (evening scene color-based WB correction value) (step S1705). Then, the CPU 103 returns to the WB correction value calculation process in FIG. 13.

In FIG. 16D, a point of (R/G, B/G) coordinates corresponding to the infrared light-based WB correction value is denoted by reference numeral 1614, and a point of (R/G, B/G) coordinates corresponding to the white-based WB correction value is denoted by reference numeral 1615. Further, a point of (R/G, B/G) coordinates corresponding to the mixed WB correction value is denoted by reference numeral 1616, and a point of (R/G, B/G) coordinates corresponding to the evening scene color-based WB correction value is denoted by reference numeral 1617.

The coordinates of a point obtained by dividing a straight line connecting the point 1614 and the point 1615 according to the addition ratio Ratio_W_IR are set to the (R/G, B/G) coordinates of the point 1616 corresponding to the mixed WB correction value. And, the coordinates of a point reached by shifting the point 1616 toward the high temperature side along the blackbody radiation locus 501 by a predetermined value are set to the (R/G, B/G) coordinates of the point 1617 corresponding to the evening scene color-based WB correction value.

With the above-described processing, it is possible to smoothly shift a value between the white-based WB correction value and the infrared light-based WB correction value, and obtain an image having a shade of color emphasized in redness, which becomes an evening scene.

Then, the RAW data stored in the primary storage device 104 is converted to image data using the evening scene color-based WB correction value obtained as above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-112589 filed May 30, 2014, which is hereby incorporated by reference herein in its entirety.

What is claimed is:

1. An image pickup apparatus comprising:
   an image pickup device;
   an acquisition unit configured to divide an image obtained by image pickup performed by said image pickup device into a plurality of areas, and acquire a color evaluation value from each area;
   an infrared light sensor configured to detect infrared light from each of areas of an object defined in association with the areas of the image;
   a calculation unit configured to calculate a white balance correction value using a plurality of color evaluation values acquired from the image; and
   a processing unit configured to perform white balance correction processing on the image using a mixed white balance correction value calculated by said calculation unit,
   wherein said calculation unit includes:
   a first white balance correction value calculation section configured to calculate a first white balance correction value, using, out of the plurality of color evaluation values, color evaluation values which are included in a white detection range set in a color space,
   a second white balance correction value calculation section configured to calculate a second white balance correction value, using, out of the plurality of color evaluation values, color evaluation values which are acquired from areas each having an infrared light amount larger than a predetermined amount, and are included in a detection range of a predetermined color other than white, set in the color space, and
   a mixed white balance correction value calculation section configured to calculate a mixed white balance correction value by mixing the first white balance correction value and the second white balance correction value.

2. The image pickup apparatus according to claim 1, further comprising a reliability calculation unit configured to calculate a reliability of the first white balance correction value calculated by said calculation unit, and
   wherein in a case where the reliability of the first white balance correction value is higher than a predetermined value, said processing unit performs white balance correction on the image using the first white balance correction value in place of the mixed white balance correction value.

3. The image pickup apparatus according to claim 2, wherein said reliability calculation unit calculates the reliability of the first white balance correction value based on a proportion of areas each having a color evaluation value included in the white detection range to the whole image.

4. The image pickup apparatus according to claim 2, wherein said reliability calculation unit calculates the reliability of the first white balance correction value based on a distance between a position corresponding to the first white balance correction value in the color space, and a blackbody radiation locus.

5. The image pickup apparatus according to claim 1, wherein when the second white balance correction value is calculated, said calculation unit integrates color evaluation values included in the range for detecting the predetermined color, by weighting each color evaluation value according to the infrared light amount in an area from which the color evaluation value is detected, and calculates the second white balance correction value using the integrated color evaluation value.

6. The image pickup apparatus according to claim 5, wherein said calculation unit integrates the color evaluation values, by performing weighting such that as an area has a larger infrared light amount, weighting of the area is increased, and calculates the second white balance correction value using the integrated color evaluation value.

7. The image pickup apparatus according to claim 1, further comprising a luminance detection unit configured to detect a luminance from each of areas of the object defined in association with the areas of the image, respectively, and
   wherein said calculation unit integrates the color evaluation values, by performing weighting such that as an area has a higher luminance value, weighting of the area is increased, and calculates the second white balance correction value using the integrated color evaluation value.

8. The image pickup apparatus according to claim 1, further comprising a determination unit configured to determine whether the color of each area of the image is a color of light from a light source or a color of an object, based on the infrared light amount detected from the area.

9. The image pickup apparatus according to claim 1, wherein said calculation unit calculates the mixed white balance correction value by mixing the first white balance correction value and the second white balance correction value such that as a proportion of areas each having an infrared light amount larger than the predetermined amount, to the whole image, is larger, a ratio of the second white balance correction value to the first white balance correction value becomes larger.

10. The image pickup apparatus according to claim 1, wherein said calculation unit calculates the mixed white balance correction value by mixing the first white balance correction value and the second white balance correction value such that as an averaged infrared light amount in areas each having an infrared light amount larger than the predetermined amount is larger, a ratio of the second white balance correction value to the first white balance correction value becomes larger.

11. An image pickup apparatus comprising:
an image pickup device;
an acquisition unit configured to divide an image obtained by image pickup performed by said image pickup device into a plurality of areas, and acquire a color evaluation value from each area;
an infrared light sensor configured to detect infrared light from each of areas of an object defined in association with the areas of the image;
a calculation unit configured to calculate a white balance correction value using a plurality of color evaluation values acquired from the image, based on a result of detection of an infrared light amount, performed, on an area-by-area basis, by said infrared light sensor; and
a processing unit configured to perform white balance correction processing on the image using the white balance correction value calculated by said calculation unit.

12. A method of controlling an image pickup apparatus including an image pickup device, including:
dividing an image obtained by image pickup performed by said image pickup device into a plurality of areas, and acquiring a color evaluation value from each area,
detecting infrared light from each of areas of an object defined in association with the areas of the image,
calculating a white balance correction value using a plurality of color evaluation values acquired from the image, and
performing white balance correction processing on the image using a mixed white balance correction value calculated in said calculating,
wherein said calculating comprises:
calculating a first white balance correction value, using, out of the plurality of color evaluation values, color evaluation values which are included in a white detection range set in a color space;
calculating a second white balance correction value, using, out of the plurality of color evaluation values, color evaluation values which are acquired from areas each having an infrared light amount larger than a predetermined amount, and are included in a detection range of a predetermined color other than white, set in the color space; and
calculating a mixed white balance correction value by mixing the first white balance correction value and the second white balance correction value.

* * * * *